United States Patent
Yang et al.

(10) Patent No.: US 11,658,856 B2
(45) Date of Patent: May 23, 2023

(54) COMPUTER-GENERATED SEQUENCE DESIGN FOR BINARY PHASE SHIFT KEYING MODULATION DATA

(71) Applicant: QUALCOMM Incorporated, San Diego, CA (US)

(72) Inventors: Wei Yang, San Diego, CA (US); Yi Huang, San Diego, CA (US); Seyong Park, San Diego, CA (US); Gokul Sridharan, Sunnyvale, CA (US); Peter Gaal, San Diego, CA (US); Alexandros Manolakos, Escondido, CA (US); Xiao Feng Wang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/347,192

(22) Filed: Jun. 14, 2021

(65) Prior Publication Data

US 2021/0314203 A1    Oct. 7, 2021

Related U.S. Application Data

(62) Division of application No. 16/670,854, filed on Oct. 31, 2019, now Pat. No. 11,038,729.

(Continued)

(30) Foreign Application Priority Data

Nov. 2, 2018    (GR) .............................. 20180100499

(51) Int. Cl.
*H04L 27/20*    (2006.01)
*H04W 72/04*    (2009.01)
(Continued)

(52) U.S. Cl.
CPC ........ *H04L 27/2613* (2013.01); *H04L 5/0048* (2013.01); *H04L 5/023* (2013.01);
(Continued)

(58) Field of Classification Search
CPC . H04L 5/0048; H04L 5/0023; H04L 27/2671; H04L 27/2672; H04W 72/0413
(Continued)

(56) References Cited

U.S. PATENT DOCUMENTS 11,038,729  B2    6/2021   Yang et al.
2008/0253484 A1  10/2008  Kakura et al.
(Continued)

OTHER PUBLICATIONS

3GPP TS 36.211: "3rd Generation Partnership Project; Technical Specification Group Radio Access Network; Evolved Universal Terrestrial Radio Access (E-UTRA); Physical Channels and Modulation (Release 11)", 3GPP Standard; 3rd Generation Partnership Project (3GPP), Mobile Competence Centre; 650, Route Des Lucioles; F-06921 Sophia-Antipolis Cedex; France, vol. RAN WG1, No. V11.4.0, Sep. 20, 2013 (Sep. 20, 2013), pp. 1-120, XP050712717, [retrieved on Sep. 20, 2013].

(Continued)

*Primary Examiner* — Ted M Wang

(57) ABSTRACT

Methods, systems, and devices for wireless communications are described. A device (e.g., a base station or a user equipment (UE)) may identify a sequence length corresponding to a number of resource blocks, and select a modulation scheme based on the sequence length. The device may select, from a set of sequences associated with the modulation scheme, a sequence having the sequence length. In some examples, the set of sequences may include at least one of a set of time domain phase shift keying computer-generated sequences or a set of frequency domain phase shift keying computer-generated sequences. The device may generate a reference signal for a data transmis- (Continued)

sion based on the sequence and transmit the reference signal within the number of resource blocks.

19 Claims, 23 Drawing Sheets

Related U.S. Application Data

(60) Provisional application No. 62/822,480, filed on Mar. 22, 2019, provisional application No. 62/794,534, filed on Jan. 18, 2019, provisional application No. 62/791,581, filed on Jan. 11, 2019.

(51) Int. Cl.
*H04L 27/26* (2006.01)
*H04L 5/00* (2006.01)
*H04L 5/02* (2006.01)

(52) U.S. Cl.
CPC ...... *H04L 27/2082* (2013.01); *H04L 27/2671* (2013.01); *H04L 27/2672* (2013.01); *H04W 72/0413* (2013.01)

(58) Field of Classification Search
USPC .......................................... 375/308
See application file for complete search history.

(56) References Cited

U.S. PATENT DOCUMENTS

| 2011/0170504 | A1 | 7/2011 | Xu et al. |
| 2014/0078941 | A1* | 3/2014 | Seo ............... H04L 1/1893 370/280 |
| 2016/0295562 | A1 | 10/2016 | Han et al. |
| 2017/0338989 | A1 | 11/2017 | Wu et al. |
| 2018/0123849 | A1 | 5/2018 | Si et al. |
| 2019/0200307 | A1* | 6/2019 | Si ............... H04L 5/0048 |
| 2020/0021414 | A1 | 1/2020 | Ding et al. |

OTHER PUBLICATIONS

Interdigital Inc: "Evaluation of CGS candidates for PUCCH", 3GPP Draft, 3GPP TSG RAN WGI Meeting 90bis, R1-1718848 Evaluation of CGS Candidates for PUCCH, 3rd Generation Partnership Project (3GPP), Mobile Competence Centre, 650, Route Des Lucioles, F-06921, Sophia-Antipolis Cedex, France, vol. RAN WG1, No. Prague, CZ, Oct. 9, 2017-Oct. 13, 2017, Oct. 9, 2017 (Oct. 9, 2017), XP051341989, 21 Pages, Retrieved from the Internet: URL: http://www.3gpp.org/ftp/Meetings_3GPP_SYNC/RAN1/Docs/ [retrieved on Oct. 9, 2017], Section 2. and 6.2, figure 1.
International Search Report and Written Opinion—PCT/US2019/059502—ISA/EPO—dated Feb. 6, 2020.
Interdigital Inc: "Evaluation of CGS Candidates for PUCCH", 3GPP TSG RAN WG1 Meeting 90bis, R1-1718490, Prague, CZ, 20171009-20171013, 18 Pages.
Taiwan Search Report—TW108139743—TIPO—dated Nov. 29, 2022.

* cited by examiner

| Index 605-a | Time Domain Sequences of Length 6 610-a |
|---|---|
| 0  | -7  5  1  5  -7  -3 |
| 1  | -7  -3  1  -3  7  -5 |
| 2  | -7  -3  7  3  7  -5 |
| 3  | -7  3  7  3  7  -5 |
| 4  | -7  -3  1  -3  1  -5 |
| 5  | -7  5  -7  -3  -7  -3 |
| 6  | -7  -3  1  -3  -7  -3 |
| 7  | -7  -3  1  -5  -1  -5 |
| 8  | -7  5  -7  3  7  -5 |
| 9  | -7  3  7  -5  7  -5 |
| 10 | -7  -3  -7  -3  1  -5 |
| 11 | -7  5  -7  -3  7  -5 |
| 12 | -7  -3  7  -5  -1  -5 |
| 13 | -7  -3  -7  -3  7  -5 |
| 14 | -7  -3  7  -5  7  -5 |
| 15 | -7  -3  -7  -3  -7  -3 |
| 16 | -7  -3  1  -5  7  -5 |
| 17 | -7  -3  -7  3  7  -5 |
| 18 | -7  3  -1  5  -7  -5 |
| 19 | -7  -5  -1  5  1  -5 |
| 20 | -7  3  -1  3  7  -5 |
| 21 | -7  -3  1  5  1  -5 |
| 22 | -7  -3  3  -1  -7  -5 |
| 23 | -7  -5  5  1  7  -5 |
| 24 | -7  -1  5  5  -1  -7 |
| 25 | -7  -5  3  -1  7  -5 |
| 26 | -7  -3  5  1  -7  -5 |
| 27 | -7  5  7  -5  1  -3 |
| 28 | -7  5  1  7  -5  -3 |
| 29 | -7  -3  -1  5  1  -5 |

| Index 605-b | Time Domain Sequences of Length 6 610-b |
|---|---|
| 0 | -7  7  7  -5  3  -1 |
| 1 | -7  -3  -3  -1  -7  5 |
| 2 | -7  3  -1  -5  -1  3 |
| 3 | -7  -1  3  7  3  -1 |
| 4 | -7  -3  3  7  3  -3 |
| 5 | -7  5  -7  -3  -5  5 |
| 6 | -7  5  -7  -3  7  5 |
| 7 | -7  -1  5  7  5  -1 |
| 8 | -7  3  -3  -5  -3  3 |
| 9 | -7  5  7  -1  -3  3 |
| 10 | -7  1  -3  5  7  5 |
| 11 | -7  -1  -3  5  7  3 |
| 12 | -7  -7  -3  1  -3  7 |
| 13 | -7  -1  -3  -1  7  3 |
| 14 | -7  -5  3  7  5  -1 |
| 15 | -7  -3  -5  -3  7  3 |
| 16 | -7  -5  3  7  3  -3 |
| 17 | -7  -3  3  -1  -7  -5 |
| 18 | -7  1  -1  5  -7  5 |
| 19 | -7  -3  -7  -3  7  5 |
| 20 | -7  -3  -7  -3  -5  5 |
| 21 | -7  5  -3  1  1  -1 |
| 22 | -7  5  -1  1  -3  1 |
| 23 | -7  3  -1  3  -5  -3 |
| 24 | -7  3  -3  -5  -1  7 |
| 25 | -7  5  -7  -3  -3  7 |
| 26 | -7  3  3  7  -5  7 |
| 27 | -7  5  -5  -1  -3  5 |
| 28 | -7  -3  -7  -5  5  1 |
| 29 | -7  1  -3  1  7  5 |

―600-b

| Index 605-c | Time Domain Sequences of Length 6 610-c |
|---|---|
| 0  | -7 -5  5  1 -5 -1 |
| 1  | -7  3  7  1  3 -3 |
| 2  | -7  3  5 -1  3 -3 |
| 3  | -7 -3  7  3 -3 -1 |
| 4  | -7  1  5  1  5 -3 |
| 5  | -7 -3  5  1 -7 -3 |
| 6  | -7 -3  3 -1 -7 -3 |
| 7  | -7  3  7  3  7 -3 |
| 8  | -7 -3  7  3 -7 -3 |
| 9  | -7 -1  3 -1  3 -3 |
| 10 | -7 -1  5  3  7 -3 |
| 11 | -7 -3  3 -1  5 -5 |
| 12 | -7 -1  5  1  7 -5 |
| 13 | -7 -1  3  1  7 -3 |
| 14 | -7  5 -7 -3 -7 -3 |
| 15 | -7  5 -7  5 -7 -3 |
| 16 | -7 -3  1 -3 -7 -3 |
| 17 | -7 -3  7  7 -5  5 |
| 18 | -7 -3  7 -5 -1 -7 |
| 19 | -7  3  7  7  1  5 |
| 20 | -7  3  7 -5  5 -7 |
| 21 | -7 -3  7 -7  3  7 |
| 22 | -7  3  7 -7 -3  7 |
| 23 | -7  3  7  1 -5 -3 |
| 24 | -7  3  5  1 -5 -1 |
| 25 | -7 -5  5 -1  3 -3 |
| 26 | -7 -3  7  3  5 -1 |
| 27 | -7 -3  5  1  5 -3 |
| 28 | -7  1  5  1 -7 -3 |
| 29 | -7  3  7  5 -5 -1 |

| Index 605-d | Time Domain Sequences of Length 6 610-d |
|---|---|
| 0 | -7  -3   5   1  -7  -3 |
| 1 | -7   1   5   1   5  -3 |
| 2 | -7  -1   5   1   7  -5 |
| 3 | -7  -1   3   1   7  -3 |
| 4 | -7  -3   7  -5   5  -7 |
| 5 | -7   3   7   7  -5   5 |
| 6 | -7  -3  -7   5  -7  -3 |
| 7 | -7  -3   1  -3  -7  -3 |
| 8 | -7   5  -7   5  -7  -3 |
| 9 | -7  -3   7  -7   3   7 |
| 10 | -7   3   7  -7  -3   7 |
| 11 | -7   3  -3   1  -5   7 |
| 12 | -7   3  -1   1  -5   5 |
| 13 | -7   3  -3  -1  -7   5 |
| 14 | -7   3  -1   3  -3   7 |
| 15 | -7  -3   5   1   5  -3 |
| 16 | -7   1   5   1  -7  -3 |
| 17 | -7  -3  -7  -3  -7  -3 |
| 18 | -7   3  -7  -3   7  -5 |
| 19 | -7   3   7   5  -1   5 |
| 20 | -7  -1  -7   7  -5   5 |
| 21 | -7  -3   7  -5   1  -5 |
| 22 | -7  -1  -7   7   1   7 |
| 23 | -7   3  -7  -5   1  -5 |
| 24 | -7  -1   3  -1  -7  -3 |
| 25 | -7   3   7   3  -7  -3 |
| 26 | -7  -3   7   3   7  -3 |
| 27 | -7  -3   3  -1   3  -3 |
| 28 | -7  -1  -7  -5   3  -5 |
| 29 | -7   1  -7   7  -3   7 |

—600-d

| Index 605-e | Time Domain Sequences of Length 6 610-e |
|---|---|
| 0  | -7 -1  3  1  5 -3 |
| 1  | -7 -3  5  1  7 -5 |
| 2  | -7  1  5  3  7 -3 |
| 3  | -7 -3  3 -1  7 -5 |
| 4  | -7 -1  3  7  3 -3 |
| 5  | -7  3 -1  3  7 -3 |
| 6  | -7  3 -1  5 -7 -3 |
| 7  | -7 -3  1  7  3 -3 |
| 8  | -7  3 -7 -3 -7 -3 |
| 9  | -7 -3  3 -3 -7 -3 |
| 10 | -7 -3 -7 -3  3 -3 |
| 11 | -7 -3 -7  3 -7 -3 |
| 12 | -7  3 -7 -5  1 -5 |
| 13 | -7 -3  1 -3  1 -5 |
| 14 | -7 -3  7  5 -7 -3 |
| 15 | -7  3  7  3  7 -5 |
| 16 | -7 -3  1 -1 -7 -3 |
| 17 | -7  5 -7  3  7 -5 |
| 18 | -7 -3  1 -1 -5 -1 |
| 19 | -7 -3 -7  7 -5 -1 |
| 20 | -7 -3  1 -5 -1 -5 |
| 21 | -7 -1  1  7  1 -5 |
| 22 | -7  3 -3  3  5 -5 |
| 23 | -7  3  1  7 -7 -1 |
| 24 | -7 -3 -5 -1 -5 -1 |
| 25 | -7 -3  7 -5  7 -5 |
| 26 | -7 -3 -7 -3  7 -5 |
| 27 | -7 -3 -5 -1 -7 -3 |
| 28 | -7 -3  7 -5 -7 -3 |
| 29 | -7 -3 -7 -3 -5 -1 |

| Index 605-f | Time Domain Sequences of Length 6 610-f |
|---|---|
| 0 | -7  5  1  5  -7  -3 |
| 1 | -7  5  -7  -3  -7  -3 |
| 2 | -7  -3  1  -3  -7  -3 |
| 3 | -7  5  -7  5  -7  -3 |
| 4 | -7  -3  3  1  -5  5 |
| 5 | -7  -3  7  1  -1  5 |
| 6 | -7  3  5  -5  1  -3 |
| 7 | -7  -1  5  7  1  -3 |
| 8 | -7  3  7  7  -5  5 |
| 9 | -7  7  -3  3  -1  5 |
| 10 | -7  -5  5  -1  3  -3 |
| 11 | -7  -5  -1  -7  -3  7 |
| 12 | -7  3  1  7  -5  5 |
| 13 | -7  -1  3  -3  -5  5 |
| 14 | -7  3  5  -1  3  -3 |
| 15 | -7  3  -3  1  7  5 |
| 16 | -7  -1  -7  3  7  5 |
| 17 | -7  3  -1  5  -5  -3 |
| 18 | -7  3  7  5  -1  5 |
| 19 | -7  -5  5  -5  1  -3 |
| 20 | -7  -1  -3  7  -5  5 |
| 21 | -7  3  7  1  -1  5 |
| 22 | -7  -5  5  -7  -3  7 |
| 23 | -7  3  5  -7  -3  7 |
| 24 | -7  -5  5  1  -5  -3 |
| 25 | -7  -1  5  1  3  -3 |
| 26 | -7  -1  5  1  -5  -3 |
| 27 | -7  5  -5  -1  5  3 |
| 28 | -7  -1  -3  3  -1  5 |
| 29 | -7  3  7  1  1  -5 |

| Index 705 | Frequency Domain Sequences of Length 6 710 |
|---|---|
| 0  | -7  -3  3  -5  -7  -7 |
| 1  | -7  1  5  -5  -7  -7 |
| 2  | -7  -7  -7  1  -7  -7 |
| 3  | -7  1  -3  7  -7  -7 |
| 4  | -7  5  -1  7  -7  -7 |
| 5  | -7  3  -7  -1  -3  -7 |
| 6  | -7  -1  1  3  -1  -7 |
| 7  | -7  5  5  7  -1  -7 |
| 8  | -7  7  7  7  -1  -7 |
| 9  | -7  -3  -3  -5  1  -7 |
| 10 | -7  5  5  7  1  -7 |
| 11 | -7  -5  -5  -5  3  -7 |
| 12 | -7  -5  -3  -5  3  -7 |
| 13 | -7  3  1  -1  3  -7 |
| 14 | -7  -1  -7  3  5  -7 |
| 15 | -7  7  1  -7  -7  -5 |
| 16 | -7  -5  7  3  -7  -5 |
| 17 | -7  -1  -7  5  -7  -5 |
| 18 | -7  3  -3  -1  1  -5 |
| 19 | -7  -5  1  5  1  -5 |
| 20 | -7  -7  -5  -5  3  -5 |
| 21 | -7  7  3  -1  5  -5 |
| 22 | -7  1  -7  5  7  -5 |
| 23 | -7  -3  1  -3  -7  -3 |
| 24 | -7  1  7  -3  -3  -3 |
| 25 | -7  -7  -3  3  1  -3 |
| 26 | -7  1  5  7  1  -3 |
| 27 | -7  -3  -1  -3  7  -3 |
| 28 | -7  3  1  1  -7  -1 |
| 29 | -7  -5  -7  5  -7  -1 |

| Index 805 | Frequency Domain Sequences of Length 12 810 | | | | | | | | | | | |
|---|---|---|---|---|---|---|---|---|---|---|---|---|
| 0  | -7 | -3 | 3  | -7 | -3 | -5 | -3 | 7  | 3  | -3 | 5  | 5  |
| 1  | -7 | 3  | -1 | -5 | -5 | 3  | 5  | 7  | 3  | -7 | 3  | 7  |
| 2  | -7 | -3 | 5  | -5 | 1  | 7  | 5  | -3 | -5 | -5 | -7 | -7 |
| 3  | -7 | 3  | -3 | 7  | 5  | 5  | 5  | -5 | -1 | 7  | -1 | -5 |
| 4  | -7 | -7 | 7  | 7  | 3  | 7  | 1  | -7 | -7 | -1 | -1 | -7 |
| 5  | -7 | -1 | -7 | -3 | 3  | -7 | -7 | -5 | 7  | 1  | -3 | -3 |
| 6  | -7 | 1  | -7 | 1  | -7 | 1  | -1 | -3 | 1  | 3  | -7 | -5 |
| 7  | -7 | -1 | 5  | 1  | -3 | 1  | -5 | -3 | 1  | -1 | 5  | 7  |
| 8  | -7 | 5  | 7  | 3  | 1  | -5 | 5  | -7 | -7 | -3 | 3  | -7 |
| 9  | -7 | -5 | 7  | -7 | -7 | -3 | 1  | -5 | -7 | 3  | -5 | 3  |
| 10 | -7 | -7 | 3  | -5 | 5  | 5  | 1  | 7  | -7 | -5 | 3  | 5  |
| 11 | -7 | -1 | -3 | 1  | 5  | -7 | 1  | -5 | -7 | -7 | -7 | -7 |
| 12 | -7 | -3 | -3 | 1  | -1 | 7  | -1 | 1  | -5 | -7 | -7 | -7 |
| 13 | -7 | 5  | -5 | 3  | -3 | 7  | 7  | -1 | 1  | 1  | 1  | 1  |
| 14 | -7 | -5 | -1 | 5  | -5 | -7 | 5  | -3 | -1 | -3 | 1  | -5 |
| 15 | -7 | -5 | 1  | 7  | 3  | 7  | 3  | -5 | -5 | 5  | 7  | -5 |
| 16 | -7 | -1 | -5 | 1  | -5 | -3 | -1 | -7 | 5  | 5  | -5 | -5 |
| 17 | -7 | -7 | 1  | 1  | -5 | -5 | -3 | -5 | 3  | -5 | 1  | 7  |
| 18 | -7 | -5 | -3 | 5  | 1  | 3  | 5  | -3 | 5  | 3  | 3  | -3 |
| 19 | -7 | 7  | -7 | 7  | -5 | 7  | -5 | -1 | 5  | 3  | -3 | -5 |
| 20 | -7 | -7 | -3 | -3 | -5 | -7 | 3  | -5 | 1  | 5  | 7  | -7 |
| 21 | -7 | 1  | -5 | -1 | -1 | -1 | 3  | -3 | -5 | 5  | 7  | -1 |
| 22 | -7 | 3  | -7 | 5  | -7 | 3  | -5 | -5 | 3  | 5  | 7  | 5  |
| 23 | -7 | -7 | 3  | 3  | -3 | 3  | -7 | 7  | -5 | -5 | 7  | 7  |
| 24 | -7 | -1 | -5 | 5  | -3 | -1 | -7 | -5 | -7 | -1 | -1 | 5  |
| 25 | -7 | -7 | -5 | -3 | 1  | -5 | 1  | -3 | -7 | -7 | 1  | 1  |
| 26 | -7 | -3 | -7 | -1 | -3 | 1  | 5  | -3 | -5 | -7 | 7  | 7  |
| 27 | -7 | 5  | 7  | -5 | -1 | -1 | -5 | -3 | 5  | -1 | -7 | -7 |
| 28 | -7 | 5  | -7 | 5  | -7 | 5  | 5  | -5 | -3 | 3  | -1 | 7  |
| 29 | -7 | 1  | -3 | -1 | -1 | -3 | 5  | -7 | -1 | -3 | 7  | -1 |

800

| Index 905 | Frequency Domain Sequences of Length 18 910 |
|---|---|
| 0  | -7  7 -3 -7  7 -5 -5  3  7 -5  5 -1  1 -1  7  5  7  5 |
| 1  | -7 -5  5 -7 -5  7  7 -1 -5  7 -3  3  1  3 -5 -3 -5 -3 |
| 2  | -7 -1  1  5 -5 -1  5  7  7  5 -1 -3  5 -1  5 -3  7 -3 |
| 3  | -7  3  1 -3  7  3 -3 -5 -5 -3  3  5 -3  3 -3  5 -5  5 |
| 4  | -7 -7 -3 -7 -7 -3  3  1 -7 -3  5  1  1  5  1 -1 -7 -1 |
| 5  | -7 -7  5 -7 -7  5 -1  1 -7  5 -3  1  1 -3  1  3 -7  3 |
| 6  | -7  3 -1  1 -1 -7 -1 -5 -1 -7 -3  1  5  3 -1 -7  7  3 |
| 7  | -7  1 -7  1  3  1  1  5 -1 -7 -7  1  1  5 -5  5  3  3 |
| 8  | -7  5  5  3 -3 -5  7  3  7  5  7 -5  1  7 -1 -3  1 -3 |
| 9  | -7 -3  5  7  7 -5 -1  1  3 -1 -1  7  1 -3  5 -3  3 -1 |
| 10 | -7  5 -3 -5 -5  7  3  1 -1  3  3 -5  1  5 -3  5 -1  3 |
| 11 | -7  7 -5  7 -7  7 -5 -5 -1  7  5  1 -3  3 -5 -1 -7 -5 |
| 12 | -7 -5  7 -5 -7 -5  7  7  3 -5 -3  1  5 -1  7  3 -7  7 |
| 13 | -7  7 -7  7  7  5 -3  7  7  1 -7 -3 -3  3  5  7  1  3 |
| 14 | -7 -5 -7 -5 -5 -3  5 -5 -5  1 -7  5  5 -1 -3 -5  1 -1 |
| 15 | -7  1  7  7  1  3 -5  5 -7  5 -5 -5  3  3  5  1  1  1 |
| 16 | -7 -7  1  1  7 -7  3 -7 -5 -7 -5  5  1  7  3 -3  1  3 |
| 17 | -7 -3  7 -3 -1  3 -1  1  3 -3 -7  1  3 -1 -7 -3  1 -7 |
| 18 | -7  1  7 -1  3 -7 -3 -5  1 -7  7  1 -1 -3  1  1  1 -1 |
| 19 | -7  5 -3  7 -5  7 -3 -7 -7 -3 -3  5  7  3  5 -3 -1 -7 |
| 20 | -7  5  3  3 -1 -1 -5  5 -7 -1  7  5 -5 -7 -3 -3  1 -1 |
| 21 | -7  5 -7 -7 -1  5  5 -7 -7  7  1 -5 -1 -7 -3  3  7  1 |
| 22 | -7 -5  5 -3  3  7 -1  1  3 -7  7 -7  7  5 -1  7  7  5 |
| 23 | -7 -1  3 -5 -1  3 -3  5  3 -7  7 -7  3  3  3 -7  1  3 |
| 24 | -7  7 -1 -7 -5 -5 -7 -3 -5  1  5 -7  3 -1 -3 -5  5 -3 |
| 25 | -7 -5 -7 -5  7 -7  3  7 -1 -7  5  1  5  7 -5 -3 -5 -7 |
| 26 | -7 -3 -3  3  5  3 -7  7 -5 -7  5  5 -5  1  7 -1  3 -3 |
| 27 | -7 -7  3  7 -1  1  7 -3  7 -3 -5 -1 -1 -5  7  1 -1 -5 |
| 28 | -7 -7 -7 -7  1 -1  1 -1  5 -5 -3  3 -3 -5 -7  1 -1 -3 |
| 29 | -7 -1 -1  5 -5 -1 -1  5  7  1 -7 -7  5  7  5  1 -5  1 |

FIG. 9

| Index 1005 | Frequency Domain Sequences of Length 24 1010 |
|---|---|
| 0  | -7 -7 -7 -7 -7 -7 -7  7 -3 -1  1  7  1  7 -1 -3  7  5 -1  3  3  1 -3 -1 |
| 1  | -7 -7 -7 -7 -7 -7 -7 -5  5  3  1 -5  1 -5  3  5 -5 -3  3 -1 -1  1  5  3 |
| 2  | -7 -7 -7 -7 -7 -7 -7  5 -5 -3  5 -1  1  7 -7  7  1  7 -1 -5  1 -7  7 -5 |
| 3  | -7 -7 -7 -7 -7 -7 -7 -3  7  5 -3  3  1 -5 -7 -5  1 -5  3  7  1 -7 -5  7 |
| 4  | -7 -7 -7 -7 -7 -7  5 -5 -7  3 -7  3  3 -5 -3  3  1  5 -5  5 -7  7 -5  1 |
| 5  | -7 -7 -7 -7 -7 -7 -3  7 -7 -1 -7 -1 -1  7  5 -1  1 -3  7 -3 -7 -5  7  1 |
| 6  | -7 -7 -7 -7 -7 -7 -7  3 -1  7  1 -3 -3 -3  3  7 -1  3 -7 -5 -7 -1  3 -3 |
| 7  | -7 -7 -7 -7 -7 -7 -7 -1  3 -5  1  5  5  5 -1 -5  3 -1 -7  7 -7  3 -1  5 |
| 8  | -7 -7 -7 -7 -7 -7  5  7  7 -1  1 -3  7  5 -1  5  7 -3  7 -3 -7 -1  5 -3 |
| 9  | -7 -7 -7 -7 -7 -7 -3 -5 -5  3  1  5 -5 -3  3 -3 -5  5 -5  5 -7  3 -3  5 |
| 10 | -7 -7 -1 -7 -7  1 -7  5  7 -7 -7 -1  7 -7  5  3 -3 -1 -5  3 -3 -7  1 -7 |
| 11 | -7 -7  3 -7 -7  1 -7 -3 -5 -7 -7  3 -5 -7 -3 -1  5  3  7 -1  5 -7  1 -7 |
| 12 | -7 -7 -3 -5  5  3  3 -1  3 -3 -7  1  7 -5 -5 -5  1 -5 -5  5 -5 -3 -5 -5 |
| 13 | -7 -7  5  7 -3 -1 -1  3 -1  5 -7  1 -5  7  7  7  1  7  7 -3  7  5  7  7 |
| 14 | -7  3  5 -5  3 -5  7  5  7 -7  3 -3 -7 -7 -5  1 -7  3  3  5 -7 -3  3  1 |
| 15 | -7 -1 -3  7 -1  7 -5 -3 -5 -7 -1  5 -7 -7  7  1 -7 -1 -1 -3 -7  5 -1  1 |
| 16 | -7 -7 -7  1  3  1 -7 -7 -5  1  3 -5  5  1 -7 -5  7 -5 -7 -7 -5  7 -5  1 |
| 17 | -7 -7 -7  1 -1  1 -7 -7  7  1 -1  7 -3  1 -7  7 -5  7 -7 -7  7 -5  7  1 |
| 18 | -7 -7  7 -7 -1 -7 -7  3 -7 -7 -7 -3  3 -5  7  1  5  1  1 -1 -7  7 -5 -5 |
| 19 | -7 -7 -5 -7  3 -7 -7 -1 -7 -7 -7  5 -1  7 -5  1 -3  1  1  3 -7 -5  7  7 |
| 20 | -7  5 -1 -5 -7  5 -7 -7  1 -7 -3 -1 -5 -1 -3  3 -7 -7 -7  1  1 -5 -7  7 |
| 21 | -7  1 -5  7  5  3  1 -1 -5 -7 -7 -1 -7 -7 -1 -7 -5 -1 -1  3 -7  7 -3 -7 |
| 22 | -7  1  7 -5 -3 -1  1  3  7 -7 -7  3 -7 -7  3 -7  7  3  3 -1 -7 -5  5 -7 |
| 23 | -7 -5  5  1 -3  7  7  3 -7 -7 -7 -3 -7  1  7 -7 -1  3  1 -3 -1 -7  7 -5 |
| 24 | -7  7 -3  1  5 -5 -5 -1 -7 -7 -7  5 -7  1 -5 -7  3 -1  1  5  3 -7 -5  7 |
| 25 | -7  1  7 -3 -7 -1 -7 -1  1  7  1 -1 -7  5  7 -1 -1  1 -3 -3 -3 -3 -3 -3 |
| 26 | -7  1 -5  5 -7  3 -7  3  1 -5  1  3 -7 -3 -5  3  3  1  5  5  5  5  5  5 |
| 27 | -7 -7  5  1 -1 -3 -7  7  1 -7  5 -1  3 -3  1  5 -7 -7 -5 -3 -7 -7 -5 -7 |
| 28 | -7 -7 -3  1  3  5 -7 -5  1 -7 -3  3 -1  5  1 -3 -7 -7  7  5 -7 -7  7 -7 |
| 29 | -7 -3 -7 -7  7  7  7 -7 -3  3  3 -7 -3 -7 -7 -1 -7  1 -1 -7  5  3  1 -7 |

COMPUTER-GENERATED SEQUENCE DESIGN FOR BINARY PHASE SHIFT KEYING MODULATION DATA

CROSS REFERENCE

The present Application for Patent is a Divisional Application of U.S. application Ser. No. 16/670,854, entitled "COMPUTER-GENERATED SEQUENCE DESIGN FOR BINARY PHASE SHIFT KEYING MODULATION DATA" filed on Oct. 31, 2019, and claims the benefit of Greece Provisional Application No. 20180100499 entitled "COMPUTER-GENERATED SEQUENCE DESIGN FOR $\pi/2$ BINARY PHASE SHIFT KEYING MODULATION DATA," filed Nov. 2, 2018, and to U.S. Provisional Patent Application No. 62/791,581 entitled, "COMPUTER-GENERATED SEQUENCE DESIGN FOR BINARY PHASE SHIFT KEYING MODULATION DATA," filed Jan. 11, 2019, and to U.S. Provisional Application No. 62/794,534 entitled "COMPUTER-GENERATED SEQUENCE DESIGN FOR BINARY PHASE SHIFT KEYING MODULATION DATA," filed Jan. 18, 2019, and to U.S. Provisional Application No. 62/822,480 entitled "COMPUTER-GENERATED SEQUENCE DESIGN FOR BINARY PHASE SHIFT KEYING MODULATION DATA," filed Mar. 22, 2019, each of which is expressly incorporated by reference herein.

BACKGROUND

The following relates generally to wireless communications, and more specifically to computer-generated sequence design for $$\frac{\pi}{2}$$

binary phase shift keying (BPSK) modulation data.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may transmit a reference signal (e.g., a cell-specific reference signal) to a UE in wireless communications with the base station. Alternatively, or additionally, the UE may transmit a reference signal (e.g., a demodulation reference signal (DMRS)) to the base station. The reference signal may provide the base station or the UE with information for use in channel estimation. In some wireless communications systems, such as in LTE-A wireless communications systems, the reference signal may be generated using a modulation scheme. Some wireless communications systems generate reference signals for certain sequence lengths that result in pilot tones transporting reference signals having a peak to average power ratio (PAPR) greater than pilot tones transporting the modulated data. As a result, generation of reference signals supporting certain sequence lengths and having certain power characteristics is desirable.

SUMMARY

The described techniques relate to improved methods, systems, devices, or apparatuses that support improved computer-generated sequence design for modulation, such as binary phase shift keying (BPSK) modulation. Generally, the described techniques provide for generating a reference signal (e.g., using a sequence from a sequence table), where a length of the sequence may correspond to a number of allocated resource blocks within which a data transmission and the reference signal are to be transmitted. A sequence may be a set of numbers (e.g., integer values), or a bit sequence (e.g., a binary sequence), an arithmetic sequence, a geometric sequence, etc. The reference signal and the data transmission may both have a peak to average power ratio (PAPR) that satisfies a PAPR threshold, and the computer-generated sequence design for reference signals may be suitable for use in New Radio (NR) systems and/or other wireless communication systems. In some wireless communications systems, the reference signal may be generated using a certain modulation scheme (e.g., a phase shift keying (PSK), a quadrature phase shift keying (QPSK)) on a sequence (e.g., a Zadoff-Chu sequence). Although some wireless communications systems generate reference signals for certain sequence lengths that result in pilot tones transporting reference signals having similar PAPR (e.g., a PAPR within a PAPR threshold) compared to pilot tones transporting modulated data, there are certain sequence lengths resulting in pilot tones transporting reference signals having a PAPR greater than pilot tones transporting the modulated data. Generating reference signals supporting certain sequence lengths and having certain characteristics is desirable.

A method of wireless communications is described. The method may include identifying a sequence length corresponding to a number of resource blocks, selecting a modulation scheme based on the sequence length, selecting, from a set of sequences associated with the modulation scheme, a sequence having the sequence length, where the set of sequences includes at least one of a set of time domain phase shift keying computer-generated sequences or a set of frequency domain phase shift keying computer-generated sequences, generating a reference signal for a data transmission based on the sequence, and transmitting the reference signal within the number of resource blocks.

An apparatus for wireless communications is described. The apparatus may include a processor, memory in electronic communication with the processor, and instructions stored in the memory. The instructions may be executable by the processor to cause the apparatus to identify a sequence length corresponding to a number of resource blocks, select a modulation scheme based on the sequence length, select, from a set of sequences associated with the modulation scheme, a sequence having the sequence length, where the set of sequences includes at least one of a set of time domain phase shift keying computer-generated sequences or a set of frequency domain phase shift keying computer-generated sequences, generate a reference signal for a data transmission based on the sequence, and transmit the reference signal within the number of resource blocks.

Another apparatus for wireless communications is described. The apparatus may include means for identifying a sequence length corresponding to a number of resource blocks, selecting a modulation scheme based on the sequence length, selecting, from a set of sequences associated with the modulation scheme, a sequence having the sequence length, where the set of sequences includes at least one of a set of time domain phase shift keying computer-generated sequences or a set of frequency domain phase shift keying computer-generated sequences, generating a reference signal for a data transmission based on the sequence, and transmitting the reference signal within the number of resource blocks.

A non-transitory computer-readable medium storing code for wireless communications is described. The code may include instructions executable by a processor to identify a sequence length corresponding to a number of resource blocks, select a modulation scheme based on the sequence length, select, from a set of sequences associated with the modulation scheme, a sequence having the sequence length, where the set of sequences includes at least one of a set of time domain phase shift keying computer-generated sequences or a set of frequency domain phase shift keying computer-generated sequences, generate a reference signal for a data transmission based on the sequence, and transmit the reference signal within the number of resource blocks.

In some examples of the method, apparatuses, and non-transitory computer-readable medium described herein, the modulation scheme includes an 8 phase shift keying (8PSK) modulation scheme.

In some examples of the method, apparatuses, and non-transitory computer-readable medium described herein, the set of time domain phase shift keying computer-generated sequence includes time domain 8PSK sequences of length 6.

In some examples of the method, apparatuses, and non-transitory computer-readable medium described herein, the set of time domain phase shift keying computer-generated sequence includes at least one of time domain 8PSK sequences of length 12, time domain 8PSK sequences of length 18, or time domain 8PSK sequences of length 24.

In some examples of the method, apparatuses, and non-transitory computer-readable medium described herein, the set of frequency domain phase shift keying computer-generated sequence includes at least one of frequency domain 8PSK sequences of length 6, frequency domain 8PSK sequences of length 12, frequency domain 8PSK sequences of length 18, or frequency domain 8PSK sequences of length 24.

In some examples of the method, apparatuses, and non-transitory computer-readable medium described herein, the data transmission includes π/2 phase shift keying modulated data transmission.

In some examples of the method, apparatuses, and non-transitory computer-readable medium described herein, the data transmission includes at least one of a physical uplink shared channel (PUSCH) transmission, a physical uplink control channel (PUCCH) transmission, a physical downlink shared channel (PDSCH) transmission, a physical downlink control channel (PDCCH) transmission, a physical sidelink shared channel (PSSCH) transmission, or a physical sidelink control channel (PSCCH) transmission.

Some examples of the method, apparatuses, and non-transitory computer-readable medium described herein may further include operations, features, means, or instructions for modulating the data transmission using π/2 binary phase shift keying (BPSK) modulation to generate a π/2 BPSK modulated data transmission, and transmitting the π/2 BPSK modulated data transmission within the number of resource blocks, where a peak to average power ratio associated with the π/2 BPSK modulated data transmission may be within a threshold of a peak to average power ratio associated with the reference signal.

Some examples of the method, apparatuses, and non-transitory computer-readable medium described herein may further include operations, features, means, or instructions for generating a set of sequence tables that each include a set of sequences for a modulation scheme and for a different sequence length, where generating each sequence of the set of sequences is based on the equation $$x(k) = e^{j\Phi(k)\frac{\pi}{8}},$$

where k is an integer value ranging from 0 to 5, and a sequence length of each sequence of the set of sequences is a length of 6, each number in each sequence having an integer value selected from a set of integer values including −7, −5, −3, −1, 1, 3, 5, and 7.

In some examples of the method, apparatuses, and non-transitory computer-readable medium described herein, one or more sequence tables of the set of sequence tables includes sequences [−7 −3 −7 −3 7 −5], [−7 −3 1 −5 −1 −5], and [−7 −3 3 −3 −7 −5].

Some examples of the method, apparatuses, and non-transitory computer-readable medium described herein may further include operations, features, means, or instructions for identifying a set of sequence tables that each include a set of sequences for a modulation scheme and for a different sequence length, and identifying, from the set of sequence tables, a sequence table including the set of sequences associated with the sequence length and the modulation scheme, where selecting the sequence may be further based on identifying the sequence table.

In some examples of the method, apparatuses, and non-transitory computer-readable medium described herein, each sequence table includes at least one of a set of time domain phase shift keying computer-generated sequences or a set of frequency domain phase shift keying computer-generated sequences corresponding to a certain sequence length.

In some examples of the method, apparatuses, and non-transitory computer-readable medium described herein, each sequence in the set of sequences is unique.

In some examples of the method, apparatuses, and non-transitory computer-readable medium described herein, each sequence in the set of sequences satisfies a cyclic auto-correlation property.

In some examples of the method, apparatuses, and non-transitory computer-readable medium described herein, each sequence in the set of sequences satisfies a cross-correlation property within the set of sequences.

In some examples of the method, apparatuses, and non-transitory computer-readable medium described herein, the set of sequences includes a level of correlation with a set of quadrature phase shift keying (QPSK) sequences.

In some examples of the method, apparatuses, and non-transitory computer-readable medium described herein, a cross-correlation between the set of sequences and the QPSK sequences is lower than a threshold, where the set of sequences is associated with a first radio access technology and the QPSK sequences are associated with a second radio access technology different from the first radio access technology.

In some examples of the method, apparatuses, and non-transitory computer-readable medium described herein, selecting the bit sequence may include operations, features, means, or instructions for selecting a sequence that includes a set of time domain phase shift keying computer-generated sequences or a set of frequency domain phase shift keying computer-generated sequences.

Some examples of the method, apparatuses, and non-transitory computer-readable medium described herein may further include operations, features, means, or instructions for modulating the sequence using the modulation scheme, where generating the reference signal for the data transmission may be further based on the modulating.

In some examples of the method, apparatuses, and non-transitory computer-readable medium described herein, the sequence length includes a sequence of length 6, a sequence of length 12, a sequence of length 18, or a sequence of length 24.

In some examples of the method, apparatuses, and non-transitory computer-readable medium described herein, the modulation scheme includes at least one of an 8 phase shift keying (8PSK) modulation scheme, a 12 phase shift keying (12PSK) modulation scheme, or a $\pi/4$ quadrature phase shift keying ($\pi/4$ QPSK) modulation scheme, or a QPSK modulation scheme.

In some examples of the method, apparatuses, and non-transitory computer-readable medium described herein, selecting the modulation scheme may include operations, features, means, or instructions for selecting a first modulation scheme when the sequence length may be a first value or selecting a second modulation scheme when sequence length may be a second value.

In some examples of the method, apparatuses, and non-transitory computer-readable medium described herein, the first modulation scheme includes an 8PSK sequence when the sequence length is a length of 6 and the second modulation scheme includes a $\pi/2$ sequence when the sequence length is greater than the length of 6.

In some examples of the method, apparatuses, and non-transitory computer-readable medium described herein, selecting the sequence may include operations, features, means, or instructions for selecting a time-domain sequence when the sequence length may be a first value or selecting a frequency-domain sequence when the sequence length may be a second value.

A method of wireless communications is described. The method may include identifying a sequence length corresponding to a number of resource blocks based on a control message, where the sequence is from a set of sequences including at least one of a set of time domain phase shift keying computer-generated sequences or a set of frequency domain phase shift keying computer-generated sequences, receiving the reference signal for a data transmission within the number of resource blocks, where the reference signal is generated based on a sequence having the sequence length, and demodulating the reference signal based on a modulation scheme associated with the sequence length.

An apparatus for wireless communications is described. The apparatus may include a processor, memory in electronic communication with the processor, and instructions stored in the memory. The instructions may be executable by the processor to cause the apparatus to identify a sequence length corresponding to a number of resource blocks associated with a reference signal based on a control message, where the sequence is from a set of sequences including at least one of a set of time domain phase shift keying computer-generated sequences or a set of frequency domain phase shift keying computer-generated sequences, receive the reference signal for a data transmission within the number of resource blocks, where the reference signal is generated based on a sequence having the sequence length, and demodulate the reference signal based on a modulation scheme associated with the sequence length.

Another apparatus for wireless communications is described. The apparatus may include means for identifying a sequence length corresponding to a number of resource blocks associated with a reference signal based on a control message, where the sequence is from a set of sequences including at least one of a set of time domain phase shift keying computer-generated sequences or a set of frequency domain phase shift keying computer-generated sequences, receiving the reference signal for a data transmission within the number of resource blocks, where the reference signal is generated based on a sequence having the sequence length, and demodulating the reference signal based on a modulation scheme associated with the sequence length.

A non-transitory computer-readable medium storing code for wireless communications is described. The code may include instructions executable by a processor to identify a sequence length corresponding to a number of resource blocks associated with a reference signal based on a control message, where the sequence is from a set of sequences including at least one of a set of time domain phase shift keying computer-generated sequences or a set of frequency domain phase shift keying computer-generated sequences, receive the reference signal for a data transmission within the number of resource blocks, where the reference signal is generated based on a sequence having the sequence length, and demodulate the reference signal based on a modulation scheme associated with the sequence length.

In some examples of the method, apparatuses, and non-transitory computer-readable medium described herein, the modulation scheme includes an 8 phase shift keying (8PSK) modulation scheme.

In some examples of the method, apparatuses, and non-transitory computer-readable medium described herein, the set of time domain phase shift keying computer-generated sequence includes time domain 8PSK sequences of length 6.

In some examples of the method, apparatuses, and non-transitory computer-readable medium described herein, the set of time domain phase shift keying computer-generated sequence includes at least one of time domain 8PSK sequences of length 12, time domain 8PSK sequences of length 18, or time domain 8PSK sequences of length 24.

In some examples of the method, apparatuses, and non-transitory computer-readable medium described herein, the set of frequency domain phase shift keying computer-generated sequence includes at least one of frequency domain 8PSK sequences of length 6, frequency domain 8PSK sequences of length 12, frequency domain 8PSK sequences of length 18, or frequency domain 8PSK sequences of length 24.

In some examples of the method, apparatuses, and non-transitory computer-readable medium described herein, the data transmission includes $\pi/2$ binary phase shift keying modulated data transmission.

In some examples of the method, apparatuses, and non-transitory computer-readable medium described herein, the data transmission includes at least one of a PUSCH transmission, a PUCCH transmission, a PDSCH transmission, a PDCCH transmission, a PSSCH transmission, or a PSCCH transmission.

Some examples of the method, apparatuses, and non-transitory computer-readable medium described herein may further include operations, features, means, or instructions for demodulating the data transmission using a π/2 binary phase shift keying modulation scheme to generate π/2 binary phase shift keying demodulated data transmission, where a peak to average power ratio associated with the π/2 binary phase shift keying demodulated data transmission may be within a threshold of a peak to average power ratio associated with the reference signal.

Some examples of the method, apparatuses, and non-transitory computer-readable medium described herein may further include operations, features, means, or instructions for identifying a set of sequence tables that each include a set of sequences for a modulation scheme and for a different sequence length, and identifying, from the set of sequence tables, a sequence table including the set of sequences associated with the sequence length and the modulation scheme, where demodulating the reference signal may be further based on identifying the sequence table.

In some examples of the method, apparatuses, and non-transitory computer-readable medium described herein, each sequence table includes at least one of a set of time domain phase shift keying computer-generated sequences or a set of frequency domain phase shift keying computer-generated sequences corresponding to a certain sequence length.

In some examples of the method, apparatuses, and non-transitory computer-readable medium described herein, each sequence in the set of sequences is unique.

In some examples of the method, apparatuses, and non-transitory computer-readable medium described herein, each sequence in the set of sequences satisfies a cyclic auto-correlation property.

In some examples of the method, apparatuses, and non-transitory computer-readable medium described herein, each sequence in the set of sequences satisfies a cross-correlation property within the set of sequences.

In some examples of the method, apparatuses, and non-transitory computer-readable medium described herein, the set of sequences includes a level of correlation with a set of QPSK sequences.

In some examples of the method, apparatuses, and non-transitory computer-readable medium described herein, a cross-correlation between the set of sequences and the QPSK sequences is lower than a threshold, where the set of sequences is associated with a first radio access technology and the QPSK sequences are associated with a second radio access technology different from the first radio access technology.

In some examples of the method, apparatuses, and non-transitory computer-readable medium described herein, identifying the sequence may include operations, features, means, or instructions for identifying a sequence that includes a set of time domain phase shift keying computer-generated sequences or a set of frequency domain phase shift keying computer-generated sequences.

In some examples of the method, apparatuses, and non-transitory computer-readable medium described herein, the sequence length includes a sequence of length 6, a sequence of length 12, a sequence of length 18, or a sequence of length 24.

In some examples of the method, apparatuses, and non-transitory computer-readable medium described herein, the modulation scheme includes at least one of an 8PSK modulation scheme, a 12PSK modulation scheme, or π/4 QPSK modulation scheme, or a QPSK modulation scheme.

binary phase shift keying (BPSK) modulation data in accordance with aspects of the present disclosure.

Figure 3:
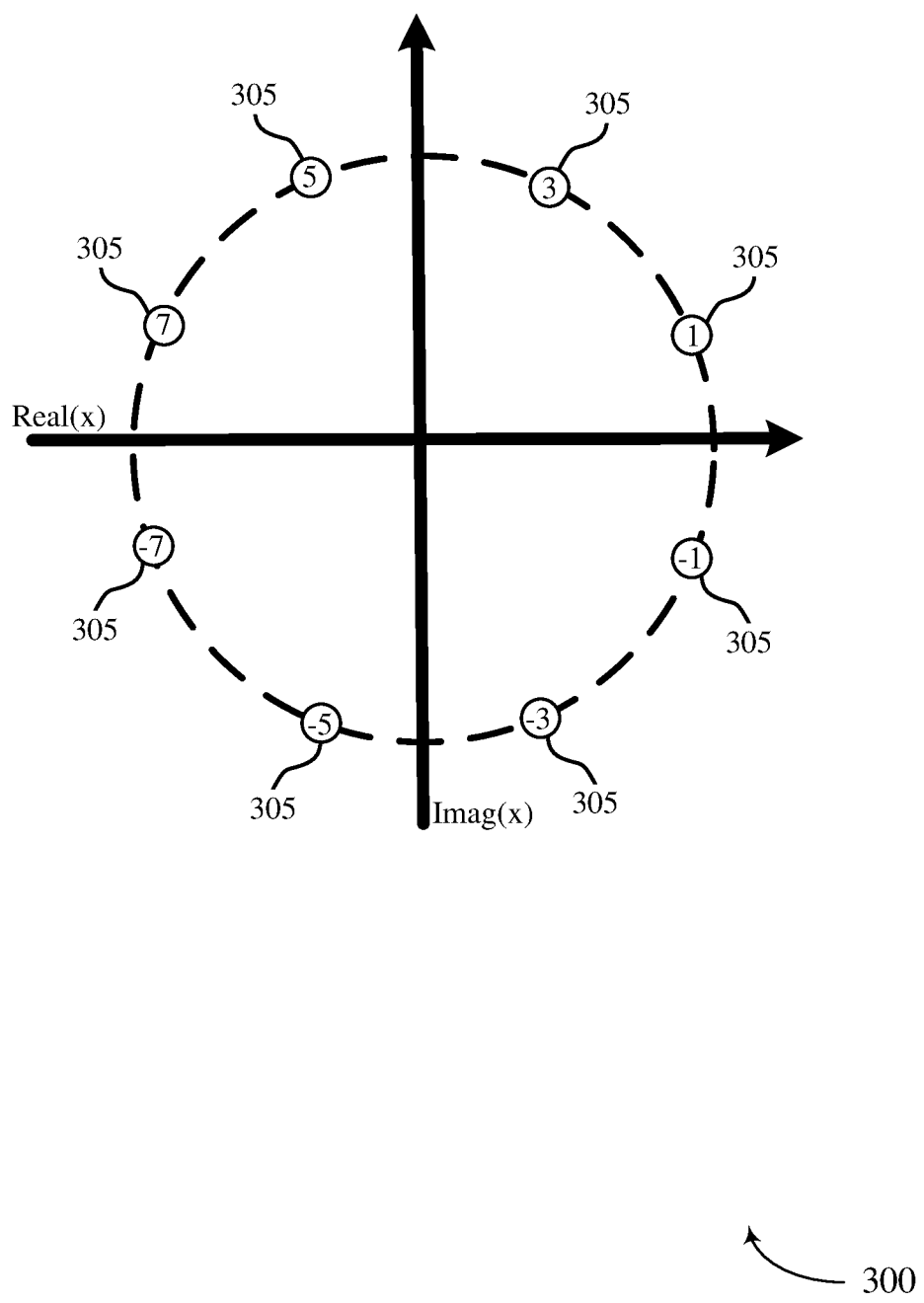

FIG. 3 illustrates an example of a constellation diagram that supports computer-generated sequence design for $$\frac{\pi}{2}$$

BPSK modulation data in accordance with aspects of the present disclosure.

Figure 4:
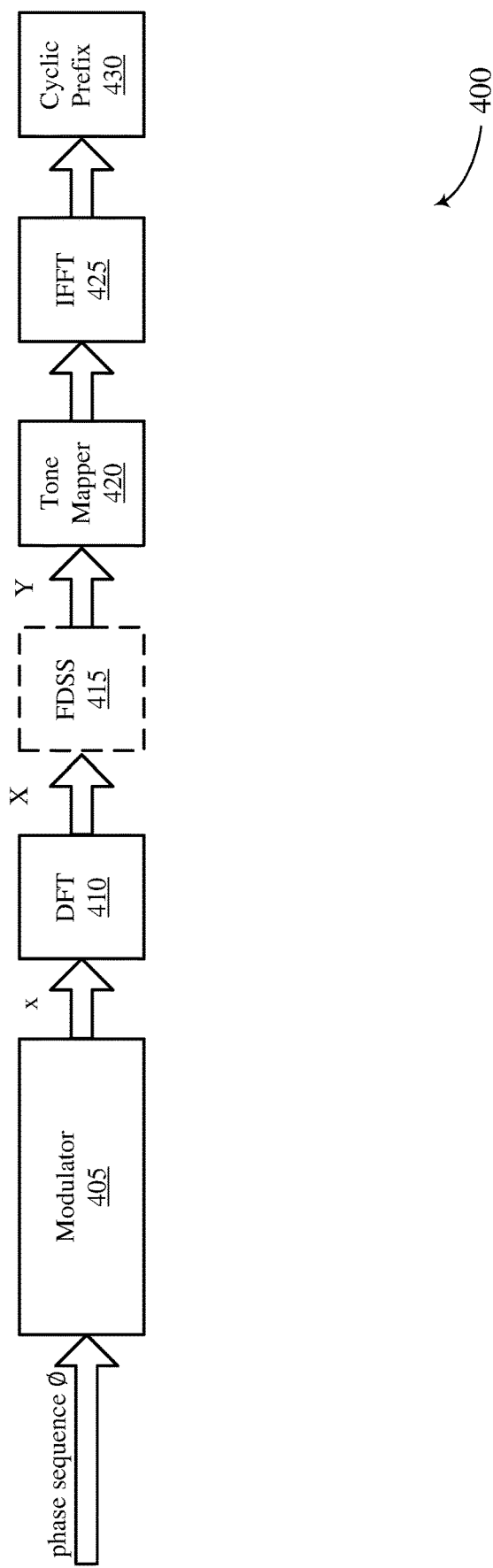
Figure 5:
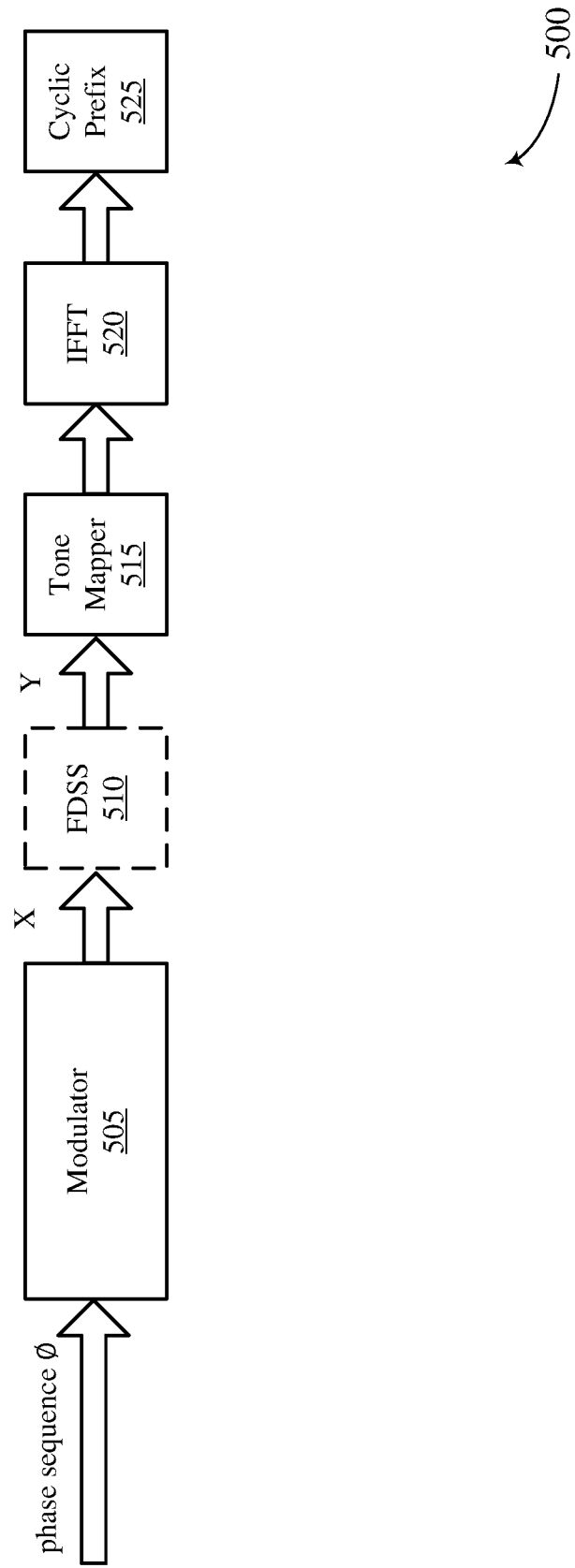

FIGS. 4 and 5 illustrate examples of transmit chains that support that supports computer-generated sequence design for $$\frac{\pi}{2}$$

BPSK modulation data in accordance with aspects of the present disclosure.

FIGS. 6A through 6F illustrate examples of sequence tables that support computer-generated sequence design for $$\frac{\pi}{2}$$

BPSK modulation data in accordance with aspects of the present disclosure.

FIGS. 7 through 10 illustrate examples of sequence tables that support computer-generated sequence design for $$\frac{\pi}{2}$$

BPSK modulation data in accordance with aspects of the present disclosure.

Figure 11:
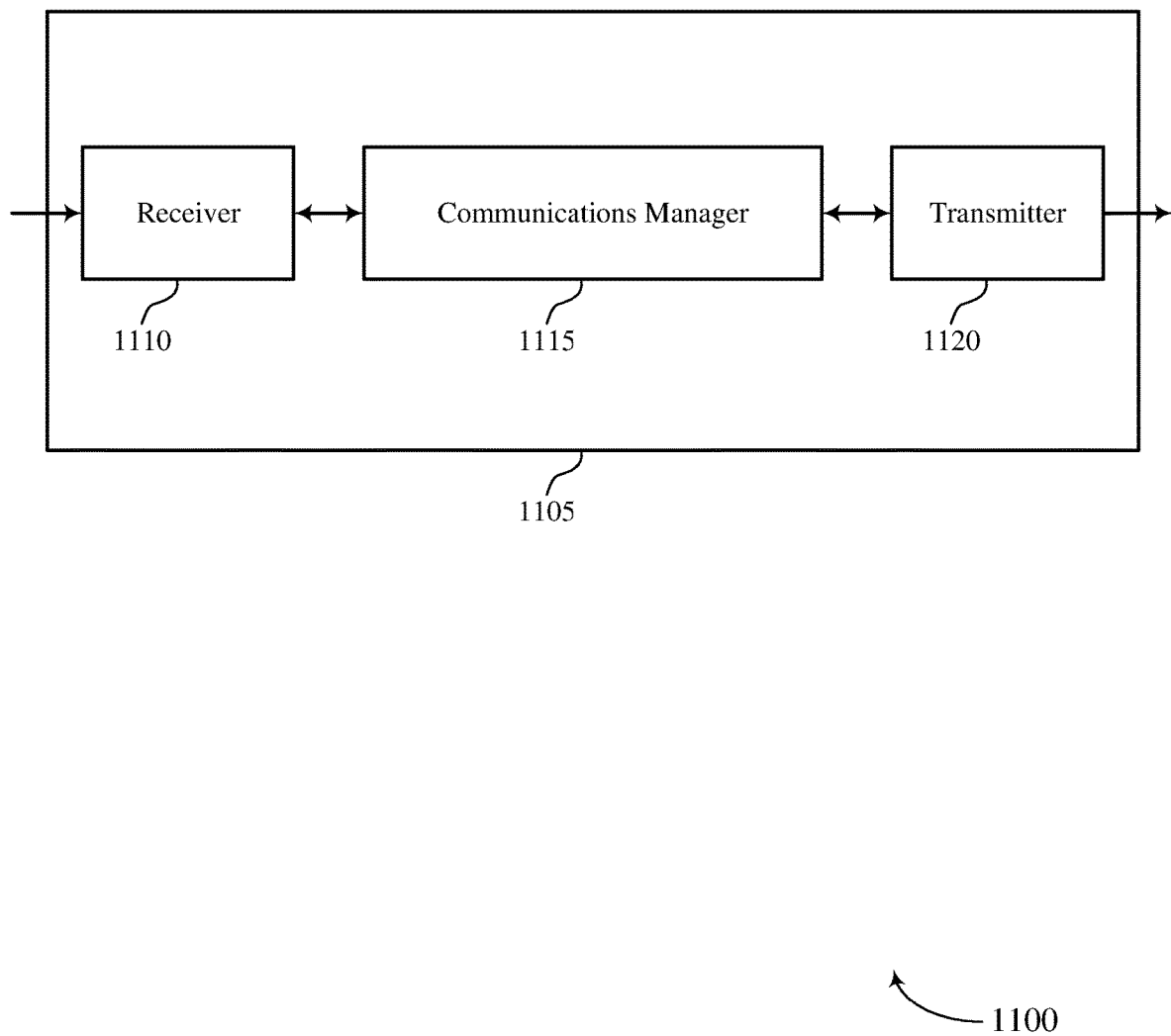
Figure 12:
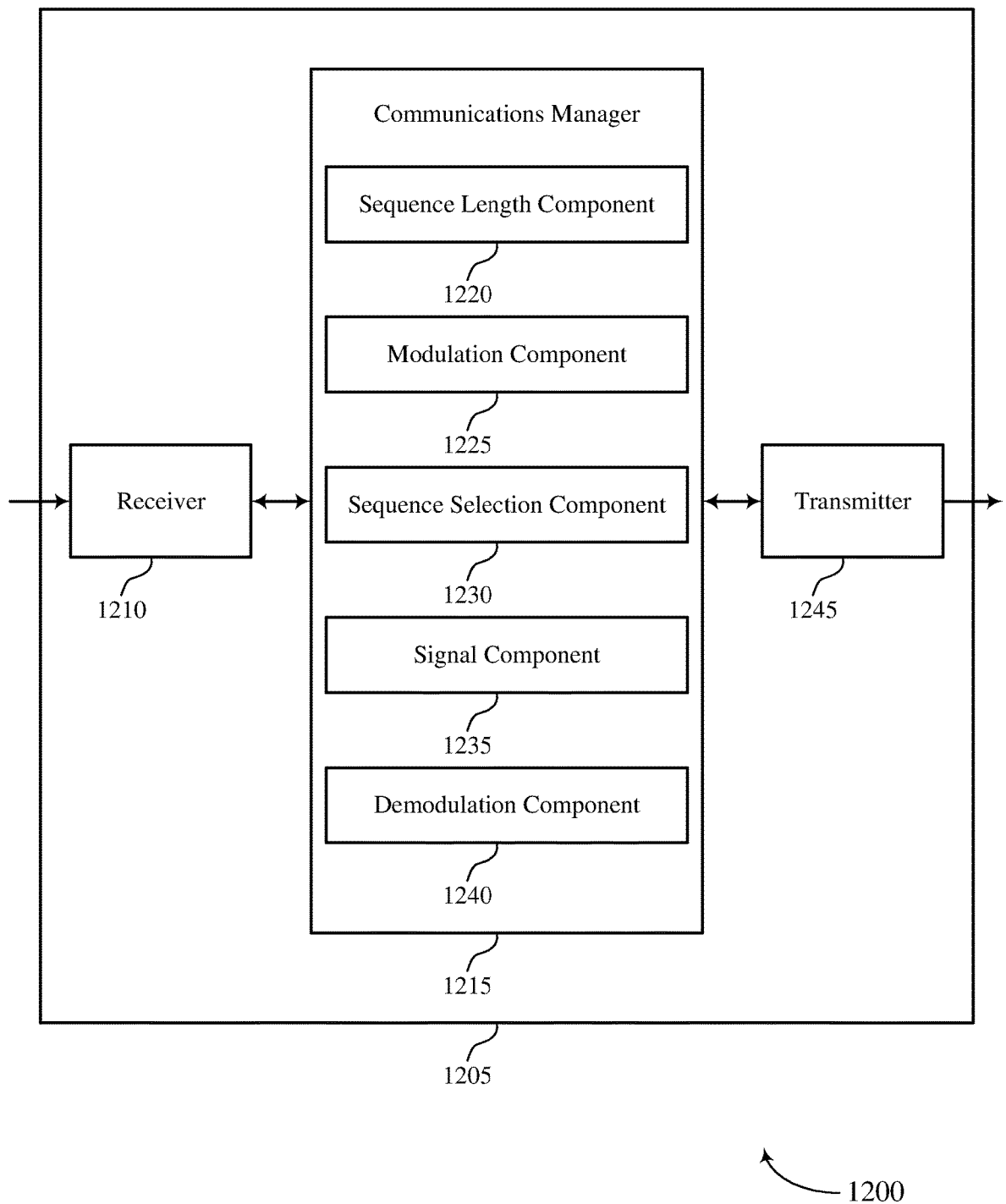

FIGS. 11 and 12 show block diagrams of devices that support computer-generated sequence design for $$\frac{\pi}{2}$$

BPSK modulation data in accordance with aspects of the present disclosure.

Figure 13:
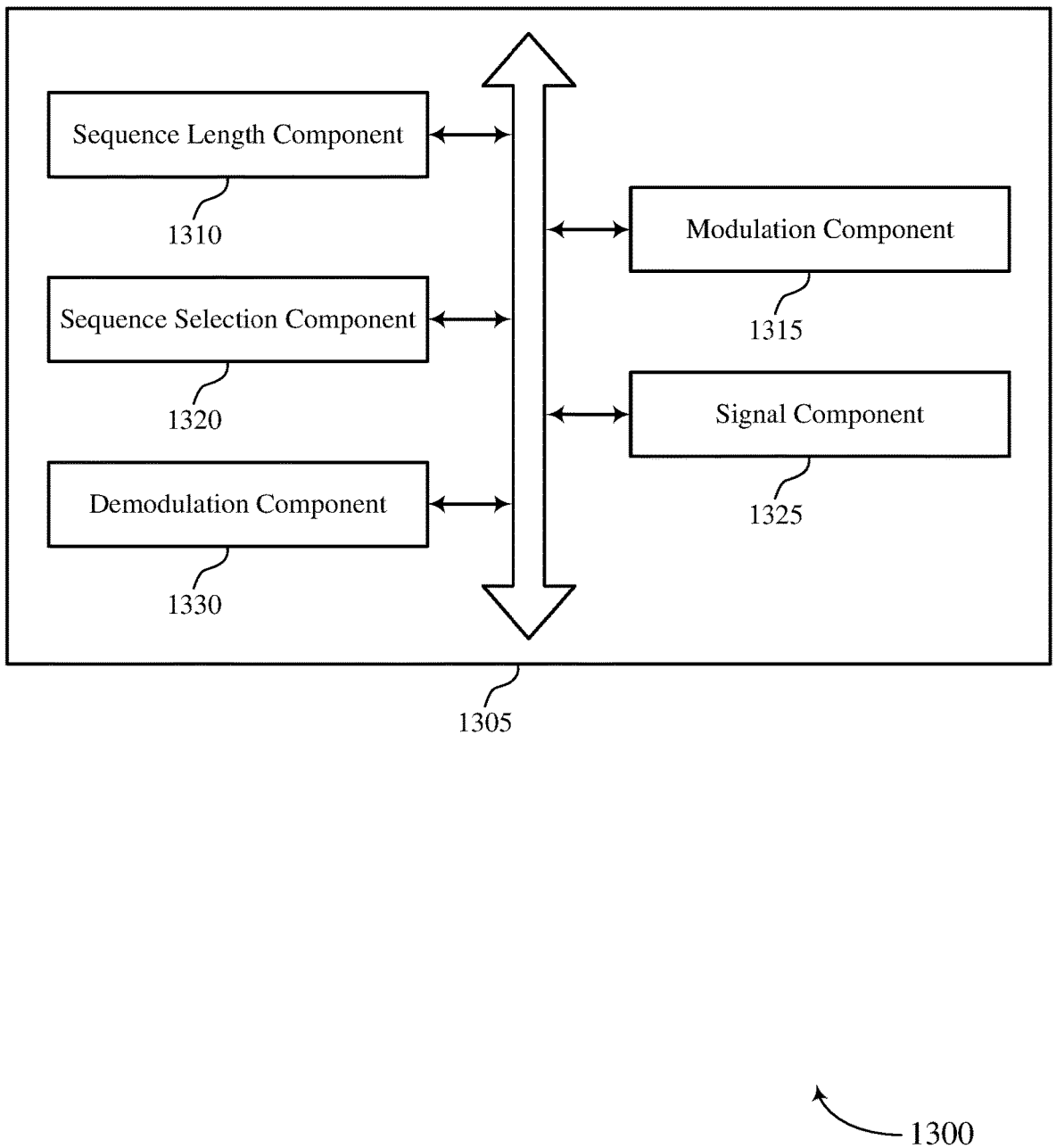

FIG. 13 shows a block diagram of a communications manager that supports computer-generated sequence design for $$\frac{\pi}{2}$$

BPSK modulation data in accordance with aspects of the present disclosure.

Figure 14:
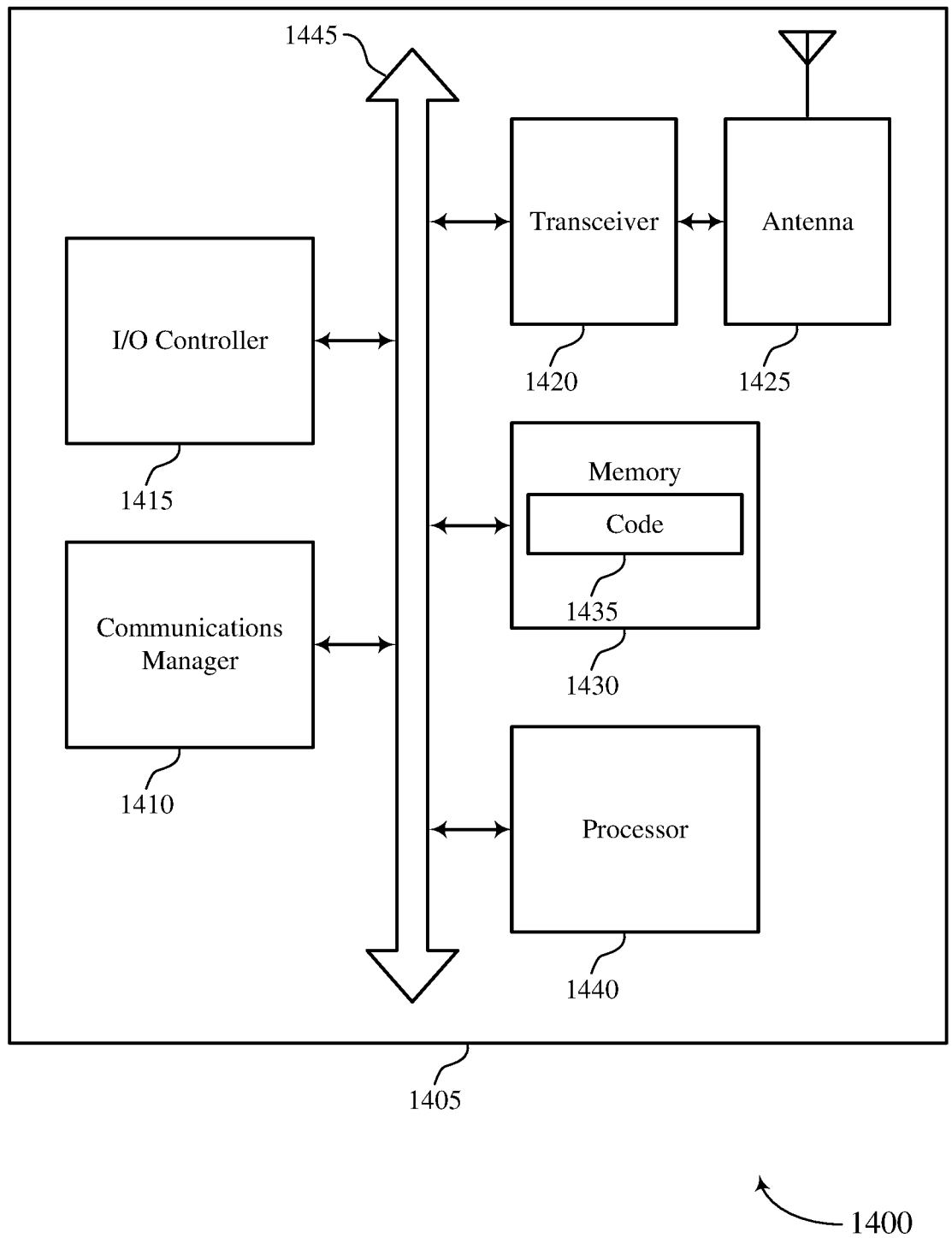

FIG. 14 shows a diagram of a system including a device that supports computer-generated sequence design for $$\frac{\pi}{2}$$

BPSK modulation data in accordance with aspects of the present disclosure.

FIGS. 15 through 18 show flowcharts illustrating methods that support computer-generated sequence design for $$\frac{\pi}{2}$$

BPSK modulation data in accordance with aspects of the present disclosure.

DETAILED DESCRIPTION

A base station may allocate a number of resource blocks for a user equipment (UE) in wireless communications with the base station, at least some of which may span a number of modulation symbols and/or a number of sub-carriers. The number of resource blocks may be for a reference signal transmission, a data transmission, or both. For example, either or both the base station and the UE may transmit a reference signal (e.g., a cell-specific reference signal, a demodulation reference signal) for a data transmission, which may be a π/2 binary phase shift keying (BPSK) modulated data transmission in some cases. Either or both the base station and the UE may identify a sequence length corresponding to the number of resource blocks, and select a modulation scheme corresponding to the sequence length. For example, the sequence length may be a length of 6, a length of 12, a length of 18, or a length of 24. The base station or the UE may select a sequence (e.g., having the sequence length) from a set of sequences (e.g., in a sequence table) associated with the modulation scheme.

The set of sequences may include at least one of a set of time domain phase shift keying computer-generated sequences or a set of frequency domain phase shift keying computer-generated sequences. For example, for sequence lengths of 6, the sequence table may correspond to time domain 8PSK computer-generated sequences (e.g., the sequence table may include a set, such as a set of 30, of time domain 8PSK computer-generated sequences). As such, the base station or the UE may use a time domain 8PSK computer-generated sequence as the reference signal (e.g., for the π/2 BPSK modulated data). The time domain 8PSK computer-generated sequences may also apply to the other sequence lengths (e.g., sequences of length 12, sequences of length 18, or sequences of length 24). The base station or the UE may alternatively use a sequence table corresponding to frequency domain 8PSK computer-generated sequences (e.g., the sequence table may include a set, such as a set of 30, of frequency domain 8PSK computer-generated sequences for different sequence lengths (e.g., sequences of length 6, sequences of length 12, sequences of length 18, or sequences of length 24)). Accordingly, the sequence tables supporting different modulation schemes and having a set of time domain phase shift keying computer-generated sequences or a set of frequency domain phase shift keying computer-generated sequences, may enable reference signal generation for data (e.g., π/2 BPSK modulated data) having a desired peak to average power ratio (PAPR) (e.g., a low PAPR or a PAPR that is within a PAPR threshold of a PAPR of the π/2 BPSK modulated data).

Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency wireless communications, among other examples, in accordance with computer-generated sequence design for $$\frac{\pi}{2}$$

BPSK modulated data. The described techniques may thus include features for improvements to power consumption, spectral efficiency, higher data rates and, in some examples, may promote enhanced efficiency for high reliability and low latency operations, among other benefits.

Aspects of the disclosure are initially described in the context of a wireless communications system. Aspects of the disclosure are then described in the context of a constellation diagram, a transmit chain diagram, and a set of sequence tables that relate to computer-generated sequence design for $$\frac{\pi}{2}$$

BPSK modulated data. Aspects of the disclosure are further illustrated by and described with reference to apparatus diagrams, system diagrams, and flowcharts that relate to computer-generated sequence design for $$\frac{\pi}{2}$$

BPSK modulated data.

Figure 1:
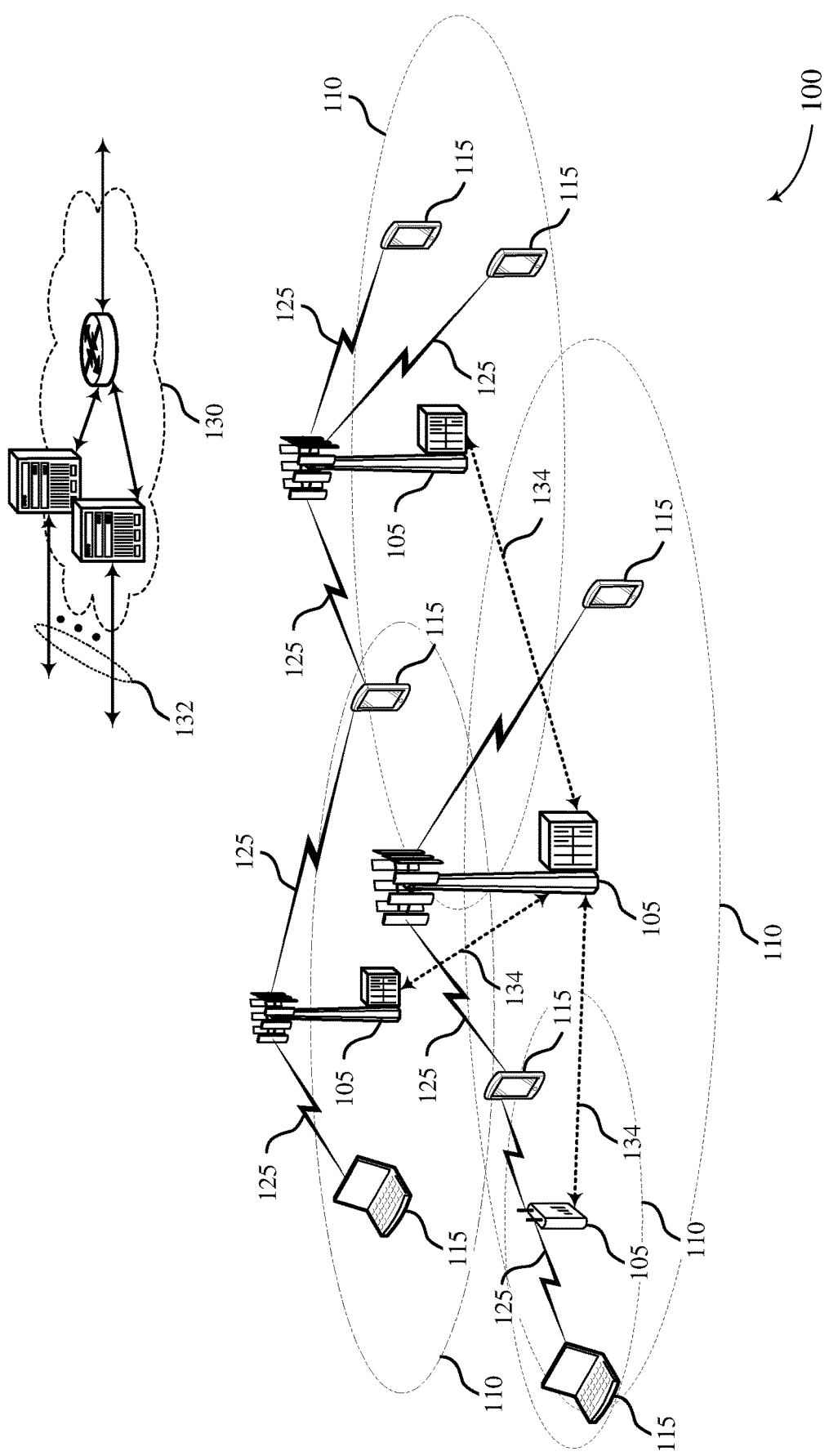
FIGS. 1 and 2 illustrate examples of wireless communications systems that support computer-generated sequence design for $$\frac{\pi}{2}$$

FIG. 1 illustrates an example of a wireless communications system 100 that supports computer-generated sequence design for $$\frac{\pi}{2}$$

BPSK modulation data in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The base station 105 may perform a connection procedure (e.g., an RRC procedure, such as a cell acquisition procedure, a random access procedure, an RRC connection establishment procedure, an RRC configuration procedure) with the UE 115. As part of the connection procedure, the base station 105 may allocate (schedule) time and frequency resources for the UE 115. For example, the base station 105 may allocate a number of resource blocks, each of which may span a number of modulation symbols (e.g., OFDM symbols) and a number of sub-carriers (e.g., 12 sub-carriers). In some examples, the number of resource blocks may be for either or both a reference signal transmission and a data transmission. For example, either or both the base station 105 and the UE 115 may transmit a reference signal (e.g., a cell-specific reference signal, a demodulation reference signal) for a data transmission, which may be a π/2 BPSK modulated data transmission.

Some wireless communications systems, for example, such as the wireless communications system 100 may modulate the π/2 BPSK modulated data transmission with DFT-s-OFDM and frequency domain spectral shaping (FDSS) to support cell edge UEs (e.g., UEs 115) to enhance cell coverage. According to some techniques, either or both the base station 105 and the UE 115 may select a sequence of a set of sequences specified in a set of sequence tables to generate a reference signal. For example, the base station 105 or the UE 115 may select a sequence for a given sequence length (e.g., sequences of length 24 or smaller) that is a computer-generated frequency domain QPSK sequence (e.g., a sequence modulated using a QPSK modulation scheme). These computer generated frequency domain QPSK sequences for reference signal generation, however, may result in a larger PAPR compared to data transmission that are π/2 BPSK modulated.

According to another technique, either or both the base station 105 and the UE 115 may select a sequence of a set of sequences specified in another set of sequence tables to generate a reference signal. This alternative set of sequence tables may contain a computer-generated time domain π/2 BPSK sequence for the reference signal generation for the π/2 BPSK modulated data transmission. Although this alternative set of sequence tables may facilitate generating reference signals for certain sequence lengths (e.g., sequences of length 12, sequence of length 18, or sequences of length 24) that result in pilot tones transporting reference signals having similar PAPR compared with pilot tones transporting modulated π/2 BPSK data, there may be certain unsupported sequence lengths (e.g., sequence of length 6) resulting in pilot tones transporting reference signals having a PAPR larger than pilot tones transporting the modulated π/2 BPSK data. According to the techniques described herein, either or both the base station 105 and the UE 115 may support a new set of sequence tables containing at least one of a set of time domain phase shift keying computer-generated sequences or a set of frequency domain phase shift keying computer-generated sequences. Each sequence table may include, for example, sequences (e.g., 30 sequences) of a given length (e.g., sequences of length 6, sequences of length 12, sequences of length 18, or sequences of length 24).

Returning to the above example, either or both the base station 105 and the UE 115 may identify a sequence length corresponding to the number of resource blocks, and select a modulation scheme corresponding to the sequence length. For example, the sequence length may be a sequence of length 6, a sequence of length 12, a sequence of length 18, or a sequence of length 24. The base station 105 or the UE 115 may then select a sequence having the sequence length from a set of sequences in a sequence table associated with the modulation scheme. The set of sequences may include a set of time domain phase shift keying computer-generated sequences or a set of frequency domain phase shift keying computer-generated sequences.

For example, for sequence length of 6, the sequence table may correspond to time domain 8PSK computer-generated sequences (e.g., the sequence table may include a set of 30 time domain 8PSK computer-generated sequences). As such, the base station 105 or the UE 115 may use a time domain 8PSK computer-generated sequence as the reference signal for the π/2 BPSK modulated data. The time domain 8PSK computer-generated sequences may also apply to the other sequence lengths (e.g., sequences of length 12, sequences of length 18, or sequence of length 24). The base station 105 or the UE 115 may alternatively use a sequence table corresponding to frequency domain 8PSK computer-generated sequences (e.g., the sequence table may include a set of 30 frequency domain 8PSK computer-generated sequences for different sequence lengths (e.g., sequences of length 6, sequences of length 12, sequences of length 18, or sequences of length 24)). Alternatively, the base station 105 may use a time domain π/2 phase shift keying computer-generated sequence as the reference signal for the π/2 BPSK modulated data.

By supporting a sequence table for different modulation schemes and having a set of time domain phase shift keying computer-generated sequences or a set of frequency domain phase shift keying computer-generated sequences, may result in each sequence of the set having a PAPR that is within a PAPR threshold from a PAPR of the modulated π/2 BPSK data. Some benefits of the techniques described herein may include improved efficiency and reduced latency in the wireless communications system 100.

Figure 2:
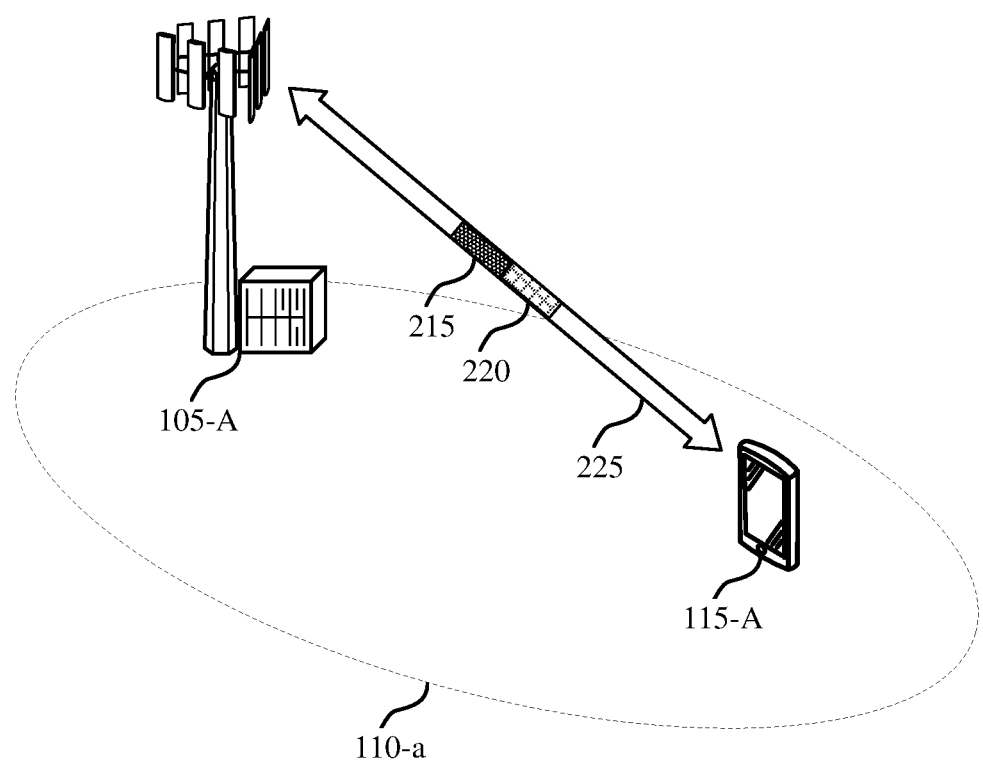

FIG. 2 illustrates an example of a wireless communications system 200 that supports computer-generated sequence design for $$\frac{\pi}{2}$$

BPSK modulation data in accordance with aspects of the present disclosure. The wireless communications system 200 may include a base station 105-a and a UE 115-a, which may be examples of the corresponding devices described with reference to FIG. 1. In some examples, the wireless communications system 200 may implement aspects of the wireless communications system 100. For example, the base station 105-a and the UE 115-a may support a set of sequence tables related to various sequence lengths and different modulation schemes. Each sequence table may include either or both a set of time domain phase shift keying computer-generated sequences and a set of frequency domain phase shift keying computer-generated sequences, which may enable reference signal transmission and data transmission having a desired PAPR (e.g., a low PAPR or a PAPR that is less than a PAPR threshold).

The base station 105-a may perform a connection procedure (e.g., an RRC procedure, such as a cell acquisition procedure, a random access procedure, an RRC connection establishment procedure, an RRC configuration procedure) with the UE 115-a. The base station 105-a may be configured with multiple antennas, which may be used for directional or beamformed transmissions. As part of the connection procedure, the base station 105-*a* may establish a bidirectional communication link 225 for communication with the UE 115-*a*. In some examples, following the connection procedure, the base station 105-*a* may allocate time and frequency resources for the UE 115-*a*. For example, the base station 105 may allocate a number of resource blocks related to a system bandwidth, each resource block may span a number of modulation symbols and a number of subcarriers.

The number of resource blocks may be for either or both a reference signal transmission and a data transmission. For example, the base station 105-*a* may allocate a subset of the resource blocks for carrying a reference signal 215 and another subset of the resource blocks for a data transmission 220 (e.g., for downlink transmission to the UE 115-*a*). In some aspects, the data transmission 220 may include a physical downlink shared channel (PDSCH) transmission or a physical downlink control channel (PDCCH) transmission. In an example, the base station 105-*a* may communicate the data transmission 220 to the UE 115-*a*, where the data transmission 220 includes a PDSCH transmission or a PDCCH transmission.

Additionally, or alternatively, the UE 115-*a* may use the subset of the resource blocks for carrying the reference signal 215 and a second subset of the resource blocks for the data transmission 220 (e.g., uplink transmission from the UE 115-*a* to the base station 105-*a*). In some aspects, the data transmission 220 may include a physical uplink shared channel (PUSCH) transmission or a physical uplink control channel (PUCCH) transmission. In an example, the UE 115-*a* may communicate the data transmission 220 to the base station 105-*a*, where the data transmission 220 includes a PUSCH transmission or a PUCCH transmission. In some aspects, the data transmission 220 may include a physical sidelink shared channel (PSSCH) transmission or a physical sidelink control channel (PSCCH) transmission. For example, the UE 115-*a* may communicate the data transmission 220 to another UE 115, where the data transmission 220 includes a PSSCH transmission or a PSCCH transmission. In some examples, the resource block allocation may include a small number of resource blocks, for example including two, three, or four resource blocks, or any number of resource blocks less than or equal to a threshold number of resource blocks (e.g., satisfying a resource block threshold) for supporting computer-generated sequences for small resource blocks for $\pi/2$ BPSK modulation.

To generate the reference signal 215, the base station 105-*a* may identify a sequence length (e.g., a sequence of length 6, a sequence of length 12, a sequence of length 18, or a sequence of length 24) corresponding to the number of allocated resource blocks. For example, the sequence length may be a function of or associated with the number of allocated resource blocks. The function or association may be a fixed relationship between the number of resource blocks and the sequence length. For example, if the number of allocated resource blocks is one or two resource blocks, the sequence length may be 12. In another example, if the number of allocated resource blocks is three resource blocks, the sequence length may be 18. In a further example, if the number of allocated resource blocks is four resource blocks, the sequence length may be 24. If the number of allocated resource blocks is more than a defined number of resource blocks (e.g., more than 4 resource blocks), the sequence length for the reference signal generation may be 24, or other techniques may be used for generating the reference signal.

The base station 105-*a* may provide an indication of the number of allocated resource blocks to the UE 115-*a*. For example, the base station 105-*a* may transmit a message (e.g., downlink control information) carrying the indication of the number of allocated resource blocks. In some examples, the message may include a sequence length of a sequence used to generate the reference signal 215. The base station 105-*a* may identify and/or select a modulation scheme according to the sequence length. For example, the modulation scheme may include an 8 phase shift keying (8PSK) modulation scheme, a 12 phase shift keying (12PSK) modulation scheme, or a $$\frac{\pi}{4}$$

quadrature phase shift keying ( $$\frac{\pi}{4}$$

QPSK), among others.

Upon identifying and/or selecting the modulation scheme to use for the given sequence length, the base station 105-*a* may identify, from a set of sequence tables (for example, see FIGS. 6 through 10), a sequence table including a set of sequences associated with the sequence length and the modulation scheme. Additionally, or alternatively, the UE 115-*a* may identify, from the set of sequence tables, a sequence table including a set of sequences associated with the sequence length and the modulation scheme. Each sequence table from the set of sequence tables may include a set of sequences for a modulation scheme and for a different sequence length. For example, each sequence table may include at least one of a set of time domain phase shift keying computer-generated sequences or a set of frequency domain phase shift keying computer-generated sequences corresponding to at least one of a certain sequence length and a modulation scheme. In some examples, the set of time domain phase shift keying computer-generated sequence may include time domain 8BPSK sequences of length 6. Additionally, or alternatively, the set of frequency domain phase shift keying computer-generated sequences may include at least one of frequency domain 8BPSK sequences of length 6, frequency domain 8BPSK sequences of length 12, frequency domain 8BPSK sequences of length 18, or frequency domain 8BPSK sequences of length 24.

Either or both the base station 105-*a* and the UE 115-*a* may in some cases use different modulation schemes for different sequence lengths. In some examples, the base station 105-*a* and the UE 115-*a* may use one modulation scheme for a first sequence having a first length L1, and use a different modulation scheme for a second sequence having a length L2. For example, the base station 105-*a* and the UE 115-*a* may use an 8PSK modulation for a sequence of length 6, and use pi/2 BPSK modulation for sequences of lengths 12, 18, 24. Alternatively, the base station 105-*a* and the UE 115-*a* may use an 8PSK modulation for sequences of length 6, 12, 18, and 24.

In some examples, either or both the base station 105-*a* and the UE 115-*a* may select a given sequence based on the sequence length. For example, the base station 105-*a* and the UE 115-*a* may select time-domain sequences for a first length L1 and use frequency-domain sequences for a second length L2. For instance, the base station 105-a and the UE 115-a may use time domain $$\frac{\pi}{2}$$

BPSK sequences for sequence lengths of 12, and use frequency domain 8PSK sequences for sequence lengths of 6, 18, or 24, or a combination thereof. Alternatively, the base station 105-a and the UE 115-a may use time domain $$\frac{\pi}{2}$$

BPSK sequences for sequences lengths of 6, 12, 18, or 24, or a combination thereof, or use frequency domain 8PSK sequences for sequence lengths of 6, 12, 18, or 24, or a combination thereof.

In some examples, either or both the base station 105-a and the UE 115-a may be preconfigured with the set of sequence tables (for example, see FIGS. 6 through 10). Each sequence table may be configured, for example, according to a set of criteria to enable reference signal transmission and data transmission having a desired PAPR determined with FDSS (e.g., a low PAPR or a PAPR that is less than a PAPR threshold). The PAPR may be determined assuming a particular FDSS that corresponds to a time domain filter (e.g., of [−0.26, 0.93, −0.26]). Alternatively, either or both the base station 105-a and the UE 115-a may generate the set of sequence tables (for example, see FIGS. 6 through 10), according to the set of criteria.

An example criteria may include that each sequence in the set of sequences is unique (e.g., nonduplicative). An 8PSK sequence may be defined by the following equation $$x(k) = e^{j\emptyset(k)\frac{\pi}{8}} \tag{1}$$

where k=0, 1, 2, 3, ... N−1, where N may be an integer that denotes a length of the sequence. At least two time domain sequences $x_1$ and $x_2$ may be equivalent (e.g., nonunique, duplicative) if $x_2$ can be obtained from $x_1$ by applying a cyclic shift to $x_1$ and multiplying each element of $x_1$ by a constant phase rotation φ, which may be defined by the following set:

$$\varphi \in \left\{0, \frac{\pi}{4}, \frac{2\pi}{4}, \frac{3\pi}{4}, \pi, \frac{5\pi}{4}, \frac{6\pi}{4}, \frac{7\pi}{m}\right\}.$$

For example, the following sequences are equivalent and a result of applying a cyclic shift to a sequence $x_1$: $\emptyset_1$=[−7 5 1 5 −7 −3], $\emptyset_2$=[1 5 −7 −3 −7 5] by cyclically-shifting $x_1$ by $x_2$, and $\emptyset_3$=[3 7 −5 −1 −5 7] that is $$x_3 = e^{j\frac{\pi}{4}} \cdot x_2,$$

where the multiplication may be performed for each element of the sequence $x_2$. In contrast to the time domain, at least two frequency domain sequences $x_1$ and $x_2$ may be equivalent (e.g., nonunique, duplicative) if $x_2$ can be obtained from $x_1$ by multiplying each element of $x_1$ by the constant phase rotation φ, and then multiplying the resulting sequence point-wise by a phase sequence from the following set of phase sequences: $\omega_1$=[0, 0, ... ], $$\omega_2 = \left[0, \frac{\pi}{2}, n, \frac{3\pi}{2}, \ldots\right],$$

$\omega_3$=[0, π, 2π, 3π, ... ], $$\omega_4 = \left[0, \frac{3\pi}{2}, 3\pi, \frac{9\pi}{2}, \ldots\right].$$

For example, two frequency domain sequences of length 6 such as, x and y may be equivalent if their elements x(k) and y(k) satisfy the following expression:

$$x(k)=e^{j\omega_3(k)} \cdot y(k) \tag{2}$$

where k=0, 1, 2, 3, ... 5.

Another example criteria may include that each sequence in the set of sequences of a sequence table satisfies a cyclic auto-correlation property. In some examples, there may be a small cyclic auto-correlation property for at least three tabs. The auto-correlation property for a sequence having delays d=−2, −1, 1, and 2 may be given by the following equation:

$$\Sigma_{0 \leq n \leq 5} x(n) \text{conj}(x(n+d)) \leq \sqrt{2} \tag{3}$$

where L is a number of symbols in a sequence (e.g., L=6, 12, 18, or 24) and indices n are interpreted as mod(L) (e.g., cyclic). For example, if L=6 and n=6, then 6 mod 6=0, and hence x(6)=x(0). In further examples, a criteria may include that each sequence in the set of sequences satisfies a cross-correlation property within the set of sequences, or has a level of correlation with a set of QPSK sequences to enable coexistence with other wireless communications systems (e.g., QPSK sequences of length 6 in LTE-A wireless communications systems).

The base station 105-a may select a sequence from a given sequence table (for example, see FIGS. 6 through 10), and generate the reference signal 215 for the data transmission 220 (e.g., a data transmission (e.g., π/2 BPSK modulated data transmission)). For example, the base station 105-a may modulate the selected sequence to using the modulation scheme to generate the reference signal 215. In some examples, the base station 105-a may modulate the data transmission 220 using a π/2 BPSK modulation scheme to generate a π/2 BPSK modulated data transmission, and transmit the modulated π/2 BPSK data transmission within the number of allocated resource blocks. In some examples, the base station 105-a may include in the message an indication (e.g., an index value) for the sequence table used from the set of sequence tables to generate the reference signal. Although the above example for generating the reference signal 215 for the data transmission (e.g., π/2 BPSK modulated data transmission) are generally explained from the base station 105-a perspective, the UE 115-a may perform the same or similar operations to generate the reference signal 215 for the data transmission 220, as well as the data transmission 220 itself. In some examples, the UE 115-a may modulate the data transmission 220 using a π/2 BPSK modulation scheme to generate a π/2 BPSK modulated data transmission, and transmit the modulated π/2 BPSK data transmission within the number of allocated resource blocks.

The UE 115-*a* may receive the message from the base station 105-*a*, and identify the indication of the number of resource blocks associated with the reference signal 215. The UE 115—may identify the sequence length corresponding to the number of resource blocks, and receive the reference signal 215 for the data transmission 220 within the number of resource blocks. For example, the UE 115-*a* may demodulate the reference signal 215 based on a modulation scheme associated with the sequence length. In some examples, the UE 115-*a* may receive and demodulate the data transmission 220 using the modulation scheme to generate a π/2 BPSK demodulated data transmission, where a PAPR associated with the π/2 BPSK demodulated data transmission is within a threshold of a PAPR associated with the reference signal 215. Although the above example for receiving the reference signal 215 for the data transmission (e.g., π/2 BPSK modulated data) are generally explained from the UE 115-*a* perspective, the base station 105-*a* may perform the same or similar operations to receive and demodulate the reference signal 215 for the data transmission 220, as well as the data transmission 220 itself.

Accordingly, either or both the bases station 105-*a* and UE 115-*a* may support using sequence information (e.g., sequence tables) for different modulation schemes and having a set of time domain phase shift keying computer-generated sequences or a set of frequency domain phase shift keying computer-generated sequences, which may result in each sequence of the set having a PAPR that is within a PAPR threshold from a PAPR of the modulated π/2 BPSK data. Some benefits of the techniques described herein may include improved efficiency and reduced latency in the wireless communications system 200.

FIG. 3 illustrates an example of a constellation diagram 300 that supports computer-generated sequence design for $$\frac{\pi}{2}$$

BPSK modulation data in accordance with aspects of the present disclosure. The constellation diagram 300 may implement aspects of the wireless communications systems 100 and 200. For example, with reference to FIG. 2, either or both the base station 105-*a* and the UE 115-*a* may modulate a sequence onto a carrier signal. In some examples, either or both the base station 105-*a* and the UE 115-*a* may apply a modulation scheme (e.g., 8PSK modulation scheme) related to the constellation diagram 300, which receives an incoming sequence and transmits the modulated sequence using a signal that can have eight different possible states, which are known as symbols 305. Each symbol may be described by an amplitude value and an initial phase value. According to the constellation diagram 300 for a given sequence (e.g., 8PSK sequence) the eight different possible states may be found by the following expression:

$$x = e^{j\emptyset \frac{\pi}{8}} \quad (4)$$

where $j=\sqrt{-1}$, $\pi=3.1415926\ldots$, and $\emptyset \in \{-7, -5, -3, -1, 1, 3, 5, 7\}$. In some examples, to represent the 8PSK sequence, it may be sufficient to prove the phase index $\emptyset$ of the constellation. For example, the following integer tuple $\{-7, -5, -3, -1, 1, 3, 5, 7\}$ represent the 8PSK sequences $$\left[ e^{\frac{-j7\pi}{8}}, e^{\frac{-j5\pi}{8}}, e^{\frac{-j3\pi}{8}}, e^{\frac{-j\pi}{8}}, e^{\frac{j\pi}{8}}, e^{\frac{j3\pi}{8}}, e^{\frac{j5\pi}{8}}, e^{\frac{j7\pi}{8}} \right].$$

FIG. 4 illustrates an example of a transmit chain 400 that supports computer-generated sequence design for $$\frac{\pi}{2}$$

BPSK modulation data in accordance with aspects of the present disclosure. The transmit chain 400 may correspond to sequences in time domain. The output of the transmit chain 400 may include a reference signal. In some examples, the transmit chain 400 may implement aspects of the wireless communications systems 100 and 200. For example, with reference to FIG. 2, either or both the base station 105-*a* and the UE 115-*a* may include a component of the transmit chain 400. In some examples, either or both the base station 105-*a* and the UE 115-*a*, may identify a sequence length corresponding to a number of resource blocks and select from a set of sequences associated with a modulation scheme, a phase sequence Ø having the sequence length. The set of sequences may include a set of time domain phase shift keying computer-generated sequences. To generate the reference signal 215, the phase sequence Ø may be provided to a modulator 405 that may apply 8PSK modulation to the phase sequence Ø. The modulator 405 may 8PSK-modulate each bit in the sequence b, and output a modulated sequence x to a discrete Fourier transform (DFT) component 410. Alternatively, the modulator 405 may 12PSK-modulate or $$\frac{\pi}{4}$$

QPSK-modulate each bit in the phase sequence Ø.

The DFT component 410 may apply a DFT operation to the modulated sequence x (e.g., time domain data) to generate frequency domain data X that is output to an FDSS component 415. In some examples, the FDSS component 415 may be an optional action in the transmit chain 400. The FDSS component 415 may perform an FDSS operation on the frequency domain data X to generate spectrally shaped frequency domain data Y. In some examples, FDSS may be a pulse-shaping filtering process implemented in the frequency domain by element-wise multiplication of the frequency domain data X and a bandwidth of the number of allocated resource blocks (e.g., a filter of bandwidth equal to the number of allocated resource blocks). In some cases, 8PSK modulation with FDSS may result in very low PAPR.

A tone mapper 420 may map the spectrally shaped data Y onto respective resource elements of the number of allocated resource blocks by selecting which subcarriers (e.g., tones) of a carrier are to respectively transport portions of the spectrally shaped data Y. Using the mapping, an inverse fast Fourier transform (IFFT) component 425 may perform an IFFT (or, equivalently, an inverse discrete Fourier Transform (IDFT)) on the spectrally shaped data to generate a time domain waveform. For example, the IFFT component 425 may mix the spectrally shaped data Y with respective subcarriers based on the mapping to generate a set of sinusoids, and sum the sinusoids to generate the time domain waveform. In some cases, a prefix adder 430 may add a cyclic prefix (CP) to the time domain waveform. The CP may be a set of samples that may be duplicated from the end of a transmitted symbol and appended (e.g., cyclically) to the beginning of the symbol. A mixer may modulate the output from the prefix adder 430 to radio frequency for transmission of a DFT-S-OFDM waveform by an antenna of either the base station 105-a or the UE 115-a via a wireless channel. In some examples, the output may be a reference signal that is generated based at least in part on the phase sequence Ø.

FIG. 5 illustrates an example of a transmit chain 500 that supports computer-generated sequence design for $$\frac{\pi}{2}$$

BPSK modulation data in accordance with aspects of the present disclosure. The transmit chain 500 may correspond to sequences in frequency domain. The output of the transmit chain 500 may include a reference signal. In some examples, the transmit chain 500 may implement aspects of the wireless communications systems 100 and 200. For example, with reference to FIG. 2, either or both the base station 105-a and the UE 115-a may include a component of the transmit chain 500. In some examples, either or both the base station 105-a and the UE 115-a, may identify a sequence length corresponding to a number of resource blocks and select from a set of sequences associated with a modulation scheme, a frequency domain phase sequence Ø having the sequence length. The set of sequences may include a set of frequency domain phase shift keying computer-generated sequences. To generate the reference signal 215, the frequency domain phase sequence Ø may be provided to a modulator 505 that may apply 8PSK modulation to the frequency domain phase sequence Ø. Alternatively, the modulator 505 may 12PSK-modulate or $$\frac{\pi}{4}$$

QPSK-modulate each bit in the phase sequence Ø.

The modulator 505 may 8PSK-modulate each bit in the frequency domain phase sequence Ø, and output a modulated sequence X to an FDSS component 510. In some examples, the FDSS component 510 may be an optional feature in the transmit chain 500. The FDSS component 510 may perform an FDSS operation on the frequency domain data X to generate spectrally shaped frequency domain data Y. In some examples, FDSS may be a pulse-shaping filtering process implemented in the frequency domain by element-wise multiplication of the frequency domain data X and a bandwidth of the number of allocated resource blocks. In some cases, 8PSK modulation with FDSS may result in very low PAPR. For example, an 8PSK sequence with FDSS may result in very low PAPR, where the selection of the 8PSK sequence may be according to the techniques described herein.

A tone mapper 515 may map the spectrally shaped data Y onto respective resource elements of the number of allocated resource blocks by selecting which subcarriers (e.g., tones) of a carrier are to respectively transport portions of the spectrally shaped data Y. Using the mapping, an IFFT component 520 may perform an IFFT (or, equivalently, an IDFT) on the spectrally shaped data to generate a time domain waveform. For example, the IFFT component 520 may mix the spectrally shaped data Y with respective subcarriers based on the mapping to generate a set of sinusoids, and sum the sinusoids to generate the time domain waveform. In some cases, a prefix adder 525 may add a CP to the time domain waveform. The CP may be a set of samples that may be duplicated from the end of a transmitted symbol and appended (e.g., cyclically) to the beginning of the symbol. A mixer may modulate the output from the prefix adder 525 to radio frequency for transmission of a DFT-S-OFDM waveform by an antenna of either the base station 105-a or the UE 115-a via a wireless channel. In some examples, the output may be a reference signal that is generated based at least in part on the phase sequence Ø.

Figure 6A:

FIG. 6A illustrates an example of a sequence table 600-a that supports computer-generated sequence design for $$\frac{\pi}{2}$$

BPSK modulation data in accordance with aspects of the present disclosure. In some examples, the sequence table 600-a may be implemented by one or more devices in accordance with aspects of the wireless communications systems 100 and 200. For example, the sequence table 600-a may correspond to time domain sequences of length 6. In some examples, a time domain sequence of length 6 in the sequence table 600-a may be used to generate a reference signal as described in FIGS. 1 through 5.

The sequence table 600-a may include a set of sequences 610-a, each of which may have a length (e.g., a length of 6). Each sequence 610-a may correspond to a particular index value of index 605-a in the sequence table 600-a. In the sequence table 600-a, the index values may range from a first value (e.g., 0) to a second value (e.g., 29). With reference to FIG. 2, the base station 105-a may inform the UE 115-a of an index value corresponding to a sequence to use for generation of the reference signal 215. The sequence may be defined by the following expression in some cases:

$$x(n) = e^{\frac{j\emptyset(n)}{8}},$$

where n=0, 1, . . . , 5, and Ø corresponds to at least one of the sequences in the set of sequences 610-a. For example, an index value of "1," for example, may correspond to a sequence of [−7 −3 1 −3 7 −5] in the sequence table 600-a. The sequence [−7 −3 1 −3 7 −5] may correspond to the following 8PSK sequence of length 6

$$\left[ e^{\frac{-j7\pi}{8}}, e^{\frac{-j3\pi}{8}}, e^{\frac{j\pi}{8}}, e^{\frac{-j3\pi}{8}}, e^{\frac{j7\pi}{8}}, e^{\frac{-j5\pi}{8}} \right].$$

The sequence table 600-a may satisfy one or more of criteria (e.g. as described in FIG. 2). For example, each sequence in the set of sequences 610-a may be unique, or satisfy a cyclic auto-correlation property, or satisfy a cross-correlation property within the set of sequences 610-a, or have a level of correlation with a set of QPSK sequences, or a combination thereof.

Figure 6B:

FIG. 6B illustrates an example of a sequence table 600-b that supports computer-generated sequence design for $$\frac{\pi}{2}$$

BPSK modulation data in accordance with aspects of the present disclosure. In some examples, the sequence table 600-*b* may be implemented by one or more devices in accordance with aspects of the wireless communications systems 100 and 200. For example, the sequence table 600-*b* may correspond to time domain sequences of length 6. In some examples, a time domain sequence of length 6 in the sequence table 600-*b* may be used to generate a reference signal as described in FIGS. 1 through 5.

The sequence table 600-*b* may include a set of sequences 610-*b*, each of which may have a length (e.g., a length of 6). Each sequence 610-*b* may correspond to a particular index value of index 605-*b* in the sequence table 600-*b*. In the sequence table 600-*b*, the index values may range from a first value (e.g., 0) to a second value (e.g., 29). With reference to FIG. 2, the base station 105-*a* may inform the UE 115-*a* of an index value corresponding to a sequence to use for generation of the reference signal 215. The sequence may be defined by the following expression in some cases:

$$x(n) = e^{\frac{j\emptyset(n)}{8}},$$

where n=0, 1, . . . , 5, and Ø corresponds to at least one of the sequences in the set of sequences 610-*b*. For example, an index value of "0," for example, may correspond to a sequence of [−7 7 7 −5 3 −1] in the sequence table 600-*b*. The sequence table 600-*b* may satisfy one or more of criteria (e.g. as described in FIG. 2). For example, each sequence in the set of sequences 610-*b* may be unique, or satisfy a cyclic auto-correlation property, or satisfy a cross-correlation property within the set of sequences 610-*b*, or have a level of correlation with a set of QPSK sequences, or a combination thereof.

Figure 6C:

FIG. 6C illustrates an example of a sequence table 600-*c* that supports computer-generated sequence design for $$\frac{\pi}{2}$$

BPSK modulation data in accordance with aspects of the present disclosure. In some examples, the sequence table 600-*c* may correspond to time domain 8PSK sequences of length 6. In some examples, the sequence table 600-*c* may be implemented by one or more devices in accordance with aspects of the wireless communications systems 100 and 200. For example, the sequence table 600-*c* may correspond to time domain sequences of length 6. In some examples, a time domain sequence of length 6 in the sequence table 600-*c* may be used to generate a reference signal as described in FIGS. 1 through 5.

The sequence table 600-*c* may include a set of sequences 610-*c*, each of which may have a length (e.g., a length of 6). Each sequence 610-*c* may correspond to a particular index value of index 605-*c* in the sequence table 600-*c*. In the sequence table 600-*c*, the index values may range from a first value (e.g., 0) to a second value (e.g., 29). With reference to FIG. 2, the base station 105-*a* may inform the UE 115-*a* of an index value corresponding to a sequence to use for generation of the reference signal 215.

The sequence may be defined by the following expression in some cases:

$$x(n) = e^{\frac{j\emptyset(n)}{8}},$$

where n=0, 1, . . . , 5, and Ø corresponds to at least one of the sequences in the set of sequences 610-*c*. For a given 8PSK sequence x(n) in the sequence table 600-*c*, both x and its time division (TD) orthogonal complementary coded (OCC) (TD-OCC) version x' may have a peak-to-average-power ratio (PAPR) that is below a target threshold (e.g., a threshold PAPR). For example, a PAPR threshold may be 2 dB. In some examples, for an 8PSK sequence $x_{(n)} = x_1, x_2, x_3, x_4, x_5, x_6$, the TD-OCC version is $x'_{(n)} = x_1, x_2, x_3, -x_4, -x_5, -x_6$. For example, in the sequence table 600-*c*, an index value of "0," for example, may correspond to a sequence of [−7 −5 5 1 −5 −1], which may correspond to the following 8PSK sequence of length 6 $x_{(n)}=$ $$\left[ e^{\frac{-j7\pi}{8}}, e^{\frac{-j5\pi}{8}}, e^{\frac{j5\pi}{8}}, e^{\frac{j\pi}{8}}, e^{\frac{-j5\pi}{8}}, e^{\frac{-j\pi}{8}} \right],$$

and the TD-OCC version may be $x'_{(n)}=$ $$\left[ e^{-\frac{j7\pi}{8}}, e^{-\frac{j5\pi}{8}}, e^{\frac{j5\pi}{8}}, -e^{\frac{j\pi}{8}}, -e^{\frac{-j5\pi}{8}}, -e^{\frac{-j\pi}{8}} \right].$$

As defined herein, the notation x(n) (e.g., x(1), x(2), x(3), . . . ) and $x_{(n)}$ (e.g., $x_1, x_2, x_3, \ldots$) are identical and denote elements of a vector x.

The sequence table 600-*c* may satisfy one or more of criteria (e.g. as described in FIG. 2). For example, each sequence in the set of sequences 610-*c* may be unique, or satisfy a cyclic auto-correlation property, or satisfy a cross-correlation property within the set of sequences 610-*c*, or have a level of correlation with a set of QPSK sequences, or a combination thereof.

In some examples, the correlation between x and the TD-OCC version x', and the correlation between x and the +1 cyclically shifted version of x', and the correlation between x and −1 shifted version of x' may be bound by a threshold (e.g., all bounded below a second threshold target (e.g., a cross-correlation threshold)). By way of example, the +1 cyclically shifted version of x' is [$x_2, x_3, -x_4, -x_5, -x_6, x_1$], and the −1 cyclically shifted version of x' is [$x_2, x_3, -x_4, -x_5, -x_6, x_1$]. The correlation property explained above may be defined by the following expressions $$\Sigma_{i=1}^{6} x_i \cdot x^*_i = 0 \tag{5}$$

$$x_1 \cdot x^*_2 + x_2 \cdot x^*_3 + x_3 \cdot (-x_4)^* + x_4 \cdot (-x_5)^* + x_5 \cdot (-x_6)^* + x_6 \cdot x^*_1 \leq 2 \tag{6}$$

$$x_1 \cdot (-x_6)^* + x_2 \cdot x^*_1 + x_3 \cdot x^*_2 + x_4 \cdot x^*_3 + x_5 \cdot (-x_4)^* + x_6 \cdot (-x_5)^* \leq 2 \tag{7}$$

where $x^*_i$ denotes the complex conjugate of $x_i$. In an example, with reference to expressions (5) through (7), the second threshold target (i.e., the cross-correlation threshold) may be 2. In some examples, for any pair of sequences x and y in the sequence table 600-*c*, the cross correlation between the sequences x and y, and the cross correlation between the sequences x and y' (i.e., the TD-OCC version of y), between x and +1 and −1 cyclically-shifted version of y, between x and +1 and −1 cyclically-shifted version of y' may be bound by a threshold (e.g., all may be bounded by a third threshold (e.g., a second cross-correlation threshold). The cross-correlation may be defined according to the above expressions.

Figure 6D:

FIG. 6D illustrates an example of a sequence table 600-*d* that supports computer-generated sequence design for $$\frac{\pi}{2}$$

BPSK modulation data in accordance with aspects of the present disclosure. In some examples, the sequence table 600-*d* may correspond to time domain 8PSK sequences of length 6. In some examples, the sequence table 600-*d* may be implemented by one or more devices in accordance with aspects of the wireless communications systems 100 and 200. For example, the sequence table 600-*d* may correspond to time domain sequences of length 6. In some examples, a time domain sequence of length 6 in the sequence table 600-*d* may be used to generate a reference signal as described in FIGS. 1 through 5.

The sequence table 600-*d* may include a set of sequences 610-*d*, each of which may have a length (e.g., a length of 6). Each sequence 610-*d* may correspond to a particular index value of index 605-*d* in the sequence table 600-*d*. In the sequence table 600-*d*, the index values may range from a first value (e.g., 0) to a second value (e.g., 29). With reference to FIG. 2, the base station 105-*a* may inform the UE 115-*a* of an index value corresponding to a sequence to use for generation of the reference signal 215.

The sequence may be defined by the following expression in some cases:

$$x_{(n)} = e^{\frac{j\emptyset(n)}{8}},$$

where n=0, 1, . . . , 5, and Ø corresponds to at least one of the sequences in the set of sequences 610-*d*. In some examples, for a given 8PSK sequence $x_{(n)} = x_1, x_2, x_3, x_4, x_5, x_6$ in the sequence table 600-*d*, one or more sequences having a length of 12 may be generated. For example, for an 8PSK sequence $x_{(n)} = x_1, x_2, x_3, x_4, x_5, x_6$ in the sequence table 600-*d*, the following four expressions (8) through (11) may be used to generate four sequence having a length of 12:

$$a = [x,x] = [x_1, x_2, x_3, x_4, x_5, x_6, x_1, x_2, x_3, x_4, x_5, x_6] \quad (8)$$

$$b = [x_1, x_2, x_3, -x_4, -x_5, -x_6, x_1, x_2, x_3, -x_4, -x_5, -x_6] \quad (9)$$

$$c = [x_1, x_2, x_3, x_4, x_5, x_6, -x_1, -x_2, -x_3, -x_4, -x_5, -x_6] \quad (10)$$

$$d = [x_1, x_2, x_3, -x_4, -x_5, -x_6, -x_1, -x_2, -x_3, x_4, x_5, x_6] \quad (11)$$

The four generated sequences according to expressions (8) through (11) may be associated with a PAPR threshold. For example, for a given sequence (or each sequence) generated by the expressions (8) through (11) the PAPR threshold may be lower than 2.1 dB. In some examples, one or more (or each) sequence in the sequence table 600-*d* may be used as a base sequence to generate multiple demodulation reference signal (DMRS) sequences, which may correspond to one or more DMRS ports. For example, expressions (8) through (11) can be used to generate four orthogonal DMRS sequences (of length 12) corresponding to four DMRS ports from a base sequence x (of length 6). As such, for each base sequence in the sequence table 600-*d*, all generated DMRS sequences based in part on expressions (8) through (11) have a PAPR below a target PAPR threshold.

The sequence table 600-*d* may satisfy one or more criteria (e.g. as described in FIG. 2). For example, each sequence in the set of sequences 610-*d* including the set of sequences (8) through (11) generated for a given sequence in the sequence table 600-*d* may be unique, or satisfy a cyclic auto-correlation property, or satisfy a cross-correlation property within the set of sequences 610-*d* or the set of sequences (8) through (11) generated for a given sequence in the sequence table 600-*d*, or have a level of correlation with a set of QPSK sequences, or a combination thereof. For example, each sequence in the set of sequences 610-*d* including the set of sequences (8) through (11) generated for a given sequence in the sequence table 600-*d* may satisfy the cross-correlation defined according to the above expressions (5) through (7).

Figure 6E:
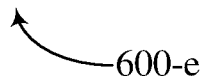

FIG. 6E illustrates an example of a sequence table 600-*e* that supports computer-generated sequence design for $$\frac{\pi}{2}$$

BPSK modulation data in accordance with aspects of the present disclosure. In some examples, the sequence table 600-*e* may correspond to time domain 8PSK sequences of length 6. In some examples, the sequence table 600-*e* may be implemented by one or more devices in accordance with aspects of the wireless communications systems 100 and 200. For example, the sequence table 600-*e* may correspond to time domain sequences of length 6. In some examples, a time domain sequence of length 6 in the sequence table 600-*e* may be used to generate a reference signal as described in FIGS. 1 through 5.

The sequence table 600-*e* may include a set of sequences 610-*e*, each of which may have a length (e.g., a length of 6). Each sequence 610-*e* may correspond to a particular index value of index 605-*e* in the sequence table 600-*e*. The index values may range from a first value (e.g., 0) to a second value (e.g., 29). With reference to FIG. 2, the base station 105-*a* may inform the UE 115-*a* of an index value corresponding to a sequence to use for generation of the reference signal 215.

A sequence may be defined by the following expression in some cases:

$$x_{(n)} = e^{\frac{j\emptyset(n)}{8}},$$

where n=0, 1, . . . , 5, and Ø relates to at least one of the sequences in the set of sequences 610-*e*. In some examples, for a given 8PSK sequence $x_{(n)} = [x_1, x_2, x_3, x_4, x_5, x_6]$ in the sequence table 600-*e*, one or more sequences having a length of 12 may be generated. For example, for an 8PSK sequence $x_{(n)} = [x_1, x_2, x_3, x_4, x_5, x_6]$ in the sequence table 600-*e*, expressions (12) and (13) may be used to generate sequences having a length of 12.

$$a = [x, x] = [x_1, x_2, x_3, x_4, x_5, x_6, x_1, x_2, x_3, x_4, x_5, x_6] \quad (12)$$

$$b = \left[x_1, x_2 e^{\frac{j*2\pi}{12}}, x_3 e^{\frac{2j*2\pi}{12}}, x_4 e^{\frac{3j*2\pi}{12}}, x_5 e^{\frac{4j*2\pi}{12}}, x_6 e^{\frac{5j*2\pi}{12}},\right.$$
$$\left. x_1 e^{\frac{6j*2\pi}{12}}, x_2 e^{\frac{7j*2\pi}{12}}, x_3 e^{\frac{8j*2\pi}{12}}, x_4 e^{\frac{9j*2\pi}{12}}, x_5 e^{\frac{10j*2\pi}{12}}, x_6 e^{\frac{11j*2\pi}{12}}\right] \quad (13)$$

In some examples, sequences generated according to expressions (12) and (13) may be associated with a PAPR threshold. In some examples, a PAPR for a given sequence (or each sequence) generated by expressions (12) and (13) may be bound by a threshold, such as 2.05 dB, for example, after applying a frequency-domain spectrum shaping (FDSS) that corresponds to a time-domain filter, such as a 3-tap filter [−0.28,1,−0.28] on the sequence generated by (12) and (13). The sequence table 600-e may satisfy one or more of criteria (e.g. as described in FIG. 2). For example, sequences generated according to expressions (12) and (13) for a given sequence in the sequence table 600-e may be unique, or satisfy a cyclic auto-correlation property, or satisfy a cross-correlation property, or have a level of correlation with a set of QPSK sequences, or a combination thereof. For example, sequences generated according to expressions (12) and (13) for a given sequence in the sequence table 600-e may satisfy the cross-correlation defined according to the above expressions (5) through (7).

In some examples, one or more sequences in the sequence table 600-e may be used as a base sequence to generate multiple DMRS sequences, which may correspond to one or more DMRS ports. For example, (12) and (13) can be used to generate two orthogonal DMRS sequences (of length 12) corresponding to two DMRS ports from a base sequence x (of length 6). Therefore, each sequence generated according to (12) and (13) may correspond to a DMRS sequence, which may correspond to a DMRS port on an uplink resource. For example, for an 8PSK sequence $x_{(n)}=[x_1, x_2, x_3, x_4, x_5, x_6]$ in the sequence table 600-e, each sequence generated according to (12) and (13) may correspond to a DMRS sequence of a DMRS port on an uplink resource. The two DMRS sequences (generated according to (12) and (13)) may be transmitted, for example, from two UEs respectively in an uplink-multi-user MIMO transmission. In some examples, DMRS sequences associated with each sequence of the sequences 610-e in the sequence table 600-e may satisfy a PAPR, an auto-correlation property, or a cross-correlation property, or any combination thereof.

Figure 6F:
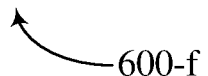

FIG. 6F illustrates an example of a sequence table 600-f that supports computer-generated sequence design for $$\frac{\pi}{2}$$

BPSK modulation data in accordance with aspects of the present disclosure. In some examples, the sequence table 600-f may correspond to time domain 8PSK sequences of length 6. In some examples, the sequence table 600-f may be implemented by one or more devices in accordance with aspects of the wireless communications systems 100 and 200. For example, the sequence table 600-f may correspond to time domain sequences of length 6. In some examples, a time domain sequence of length 6 in the sequence table 600-f may be used to generate a reference signal as described in FIGS. 1 through 5.

A sequence may be defined by the following expression in some cases:

$$x_{(n)} = e^{\frac{j\varnothing(n)}{8}},$$

where n=0, 1, . . . , 5, and Ø relates to at least one of the sequences in the set of sequences 610-f. In some examples, for a given 8PSK sequence $x_{(n)}=[x_1, x_2, x_3, x_4, x_5, x_6]$ in the sequence table 600-f, one or more sequences having a length of 12 may be generated. For example, for an 8PSK sequence $x_{(n)}=[x_1, x_2, x_3, x_4, x_5, x_6]$ in the sequence table 600-f, expressions (14) and (15) may be used to generate sequences having a length of 12. Sequences generated according to expressions (14) and (15) may be associated with a PAPR threshold. In some examples, a PAPR for a given sequence (or each sequence) generated by expressions (14) and (15) may be upper-bounded by a threshold, such as 2.05 dB, for example, after applying an FDSS that corresponds to a time-domain filter, such as a 3-tap filter [−0.28,1,−0.28] on the sequence generated by (14) and (15).

$$a=[x,x]=[x_1,x_2,x_3,x_4,x_5,x_6,x_1,x_2,x_3,x_4,x_5,x_6] \quad (14)$$

$$b=[x_1,x_2,x_3,x_4,x_5,x_6,-x_1,-x_2,-x_3,-x_4,-x_5,-x_6] \quad (15)$$

In some examples, the sequence table 600-f may satisfy one or more of criteria (e.g. as described in FIG. 2). For example, sequences generated according to expressions (14) and (15) for a given sequence in the sequence table 600-f may be unique, or satisfy a cyclic auto-correlation property, or satisfy a cross-correlation property, or have a level of correlation with a set of QPSK sequences, or a combination thereof. For example, sequences generated according to expressions (14) and (15) for a given sequence in the sequence table 600-f may satisfy the cross-correlation defined according to the above expressions (5) through (7).

One or more (or each) sequence(s) in the sequence table 600-f may be used as a base sequence to generate multiple DMRS sequences, which may correspond to one or more DMRS ports. For example, (14) and (15) can be used to generate two orthogonal DMRS sequences (of length 12) corresponding to two DMRS ports from a base sequence x (of length 6). Therefore, each sequence generated according to (14) and (15) may correspond to a DMRS sequence, which may correspond to a DMRS port on an uplink resource. For example, for a sequence in the sequence table 600-f, each sequence generated according to (14) and (15) may correspond to a DMRS sequence of a DMRS port on an uplink resource. The two DMRS sequences (generated according to (14) and (15)) may be transmitted, for example, from two UEs respectively in an uplink-multi-user MIMO transmission. In some examples, DMRS sequences associated with each sequence of the sequences 610-f in the sequence table 600-f may also satisfy a PAPR, an auto-correlation property, or a cross-correlation property, or any combination thereof, as described above.

Figure 7:

FIG. 7 illustrates an example of a sequence table 700 that supports computer-generated sequence design for $$\frac{\pi}{2}$$

BPSK modulation data in accordance with aspects of the present disclosure. In some examples, the sequence table 700 may be implemented by one or more devices in accordance with aspects of the wireless communications systems 100 and 200. For example, the sequence table 700 may correspond to frequency domain 8PSK sequences of length 6. In some examples, a frequency domain sequence of length 6 in the sequence table 700 may be used to generate a reference signal as described in FIGS. 1 through 5.

The sequence table 700 may include a set of sequences 710, each of which may have a length (e.g., a length of 6). Each sequence 710 may correspond to a particular index value of index 705 in the sequence table 700. In the sequence table 700, the index values may range from a first value (e.g., 0) to a second value (e.g., 29). With reference to FIG. 2, the base station 105-a may inform the UE 115-a of an index value corresponding to a sequence to use for generation of the reference signal 215. The sequence may be defined by the following expression:

$$x(n) = e^{\frac{j\emptyset(n)}{8}},$$

where n=0, 1, . . . , 5, and Ø corresponds to at least one of the sequences in the set of sequences 710. For example, an index value of "14," for example, may correspond to a sequence of [−7 −1 −7 3 5 −7] in the sequence table 700. The sequence table 700 may satisfy one or more of the criteria as described in FIG. 2. For example, each sequence in the set of sequences 710 may be unique, or satisfy a cyclic auto-correlation property, or satisfy a cross-correlation property within the set of sequences 710, or have a level of correlation with a set of QPSK sequences, or a combination thereof.

Figure 8:

FIG. 8 illustrates an example of a sequence table 800 that supports computer-generated sequence design for $$\frac{\pi}{2}$$

BPSK modulation data in accordance with aspects of the present disclosure. In some examples, the sequence table 800 may be implemented by one or more devices in accordance with aspects of the wireless communications systems 100 and 200. For example, the sequence table 800 may correspond to frequency domain 8PSK sequences of length 12. In some examples, a frequency domain sequence of length 12 in the sequence table 800 may be used to generate a reference signal as described in FIGS. 1 through 5.

The sequence table 800 may include a set of sequences 810, each of which may have a length (e.g., a length of 12). Each sequence 810 may correspond to a particular index value of index 805 in the sequence table 800. In the sequence table 800, the index values may range from a first value (e.g., 0) to a second value (e.g., 29). With reference to FIG. 2, the base station 105-a may inform the UE 115-a of an index value corresponding to a sequence to use for generation of the reference signal 215. The sequence may be defined by the following expression:

$$x(n) = e^{\frac{j\emptyset(n)}{8}},$$

where n=0, 1, . . . , 11, and Ø corresponds to at least one of the sequences in the set of sequences 810. The sequence table 800 may satisfy one or more of the criteria as described in FIG. 2. For example, each sequence in the set of sequences 810 may be unique, or satisfy a cyclic auto-correlation property, or satisfy a cross-correlation property within the set of sequences 810, or have a level of correlation with a set of QPSK sequences, or a combination thereof.

FIG. 9 illustrates an example of a sequence table 900 that supports computer-generated sequence design for $$\frac{\pi}{2}$$

BPSK modulation data in accordance with aspects of the present disclosure. In some examples, the sequence table 900 may be implemented by one or more devices in accordance with aspects of the wireless communications systems 100 and 200. For example, the sequence table 900 may correspond to frequency domain 8PSK sequences of length 18. In some examples, a frequency domain sequence of length 18 in the sequence table 900 may be used to generate a reference signal as described in FIGS. 1 through 5.

The sequence table 900 may include a set of sequences 910, each of which may have a length (e.g., a length of 18). Each sequence 910 may correspond to a particular index value of index 905 in the sequence table 900. In the sequence table 900, the index values may range from a first value (e.g., 0) to a second value (e.g., 29). With reference to FIG. 2, the base station 105-a may inform the UE 115-a of an index value corresponding to a sequence to use for generation of the reference signal 215. The sequence may be defined by the following expression:

$$x(n) = e^{\frac{j\emptyset(n)}{8}},$$

where n=0, 1, . . . , 17, and Ø corresponds to at least one of the sequences in the set of sequences 910. The sequence table 900 may satisfy one or more of the criteria as described in FIG. 2. For example, each sequence in the set of sequences 910 may be unique, or satisfy a cyclic auto-correlation property, or satisfy a cross-correlation property within the set of sequences 910, or have a level of correlation with a set of QPSK sequences, or a combination thereof.

FIG. 10 illustrates an example of a sequence table 1000 that supports computer-generated sequence design for $$\frac{\pi}{2}$$

BPSK modulation data in accordance with aspects of the present disclosure. In some examples, the sequence table 1000 may be implemented by one or more devices in accordance with aspects of the wireless communications systems 100 and 200. For example, the sequence table 1000 may correspond to frequency domain sequences of length 24. In some examples, a frequency domain sequence of length 24 in the sequence table 1000 may be used to generate a reference signal as described in FIGS. 1 through 5.

The sequence table 1000 may include a set of sequences 1010, each of which may have a length (e.g., a length of 24). Each sequence 1010 may correspond to a particular index value of index 1005 in the sequence table 1000. In the sequence table 1000, the index values may range from a first value (e.g., 0) to a second value (e.g., 29). With reference to FIG. 2, the base station 105-a may inform the UE 115-a of an index value corresponding to a sequence to use for generation of the reference signal 215. The sequence may be defined by the following expression:

$$x(n) = e^{\frac{j\phi(n)}{8}},$$

where n=0, 1, . . . , 23, and Ø corresponds to at least one of the sequences in the set of sequences 1010. The sequence table 1000 may satisfy one or more of the criteria as described in FIG. 2. For example, each sequence in the set of sequences 1010 may be unique, or satisfy a cyclic auto-correlation property, or satisfy a cross-correlation property within the set of sequences 1010, or have a level of correlation with a set of QPSK sequences, or a combination thereof.

It is noted that the sequence tables 600, 700, 800, 900, and 1000 are examples, and that other sequence tables may be used instead of or in addition to the listed sequences.

FIG. 11 shows a block diagram 1100 of a device 1105 that supports computer-generated sequence design for $$\frac{\pi}{2}$$

BPSK modulation data in accordance with aspects of the present disclosure. The device 1105 may be an example of aspects of a device as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to computer-generated sequence design for $$\frac{\pi}{2}$$

BPSK modulation data, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a sequence length corresponding to a number of resource blocks, select a modulation scheme based on the sequence length. The communications manager 1115 may also select, from a set of sequences associated with the modulation scheme, a sequence having the sequence length, where the set of sequences includes at least one of a set of time domain phase shift keying computer-generated sequences or a set of frequency domain phase shift keying computer-generated sequences. The communications manager 1115 may generate a reference signal for a data transmission based on the sequence, and transmit the reference signal within the number of resource blocks.

The communications manager 1115 may also receive a control message including an indication of a number of resource blocks associated with a reference signal, and receive the reference signal for a data transmission within the number of resource blocks, where the reference signal is generated based on a sequence having the sequence length. The communications manager 1115 may identify a sequence length corresponding to the number of resource blocks based on the control message, where the sequence is from a set of sequences including at least one of a set of time domain phase shift keying computer-generated sequences or a set of frequency domain phase shift keying computer-generated sequences, and demodulate the reference signal based on a modulation scheme associated with the sequence length. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

FIG. 12 shows a block diagram 1200 of a device 1205 that supports computer-generated sequence design for $$\frac{\pi}{2}$$

BPSK modulation data in accordance with aspects of the present disclosure. The device 1205 may be an example of aspects of a device 1105 or a UE 115 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to computer-generated sequence design for $$\frac{\pi}{2}$$

BPSK modulation data, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a sequence length component 1220, a modulation component 1225, a sequence selection component 1230, a signal component 1235, and a demodulation component 1240. The communications manager 1215 may be an example of aspects of the communications manager 1410 described herein.

The sequence length component 1220 may identify a sequence length corresponding to a number of resource blocks. The sequence length component 1220 may identify that the sequence length satisfies a threshold length, and select the set of time domain phase shift keying computer-generated sequences or the set of frequency domain phase shift keying computer-generated sequences based at least in part on the sequence length satisfying the threshold. The sequence length component 1220 may identify that the sequence length satisfies a threshold length, and select the set of frequency domain phase shift keying computer-generated sequences based at least in part on the sequence length satisfying the threshold. The sequence length component 1220 may select a time-domain sequence when the sequence length is a first value or selecting a frequency-domain sequence when the sequence length is a second value.

The modulation component 1225 may select a modulation scheme based on the sequence length. The modulation component 1225 may select a modulation scheme based on the sequence length. The modulation component 1225 may identify a set of modulation schemes, where each modulation scheme is for a different sequence length, where the different sequence lengths includes at least one of a sequence of length 6, a sequence of length 12, a sequence of length 18, or a sequence of length 24, and identify the modulation scheme associated with the sequence length in the set of modulation schemes, where selecting the modulation scheme is further based at least in part on identifying the modulation scheme associated with the sequence length in the set of modulation schemes. The modulation component 1225 may select a first modulation scheme when the sequence length is a first value or selecting a second modulation scheme when sequence length is a second value, where the first modulation scheme is different from the second modulation scheme. For example, the first modulation scheme may include an 8PSK sequence when the sequence length is a length of 6 and the second modulation scheme includes a $$\frac{\pi}{2}$$

sequence when the sequence length is greater than the length of 6.

The sequence selection component 1230 may select, from a set of sequences associated with the modulation scheme, a sequence having the sequence length, where the set of sequences includes at least one of a set of time domain phase shift keying computer-generated sequences or a set of frequency domain phase shift keying computer-generated sequences. The signal component 1235 may generate a reference signal for a data transmission based on the sequence and transmit the reference signal within the number of resource blocks. The signal component 1235 may receive a control message including an indication of a number of resource blocks associated with a reference signal and receive the reference signal for a data transmission within the number of resource blocks, where the reference signal is generated based on a sequence having the sequence length.

The sequence length component 1220 may identify a sequence length corresponding to the number of resource blocks based on the control message, where the sequence is from a set of sequences including at least one of a set of time domain phase shift keying computer-generated sequences or a set of frequency domain phase shift keying computer-generated sequences. The demodulation component 1240 may demodulate the reference signal based on a modulation scheme associated with the sequence length.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

FIG. 13 shows a block diagram 1300 of a communications manager 1305 that supports computer-generated sequence design for $$\frac{\pi}{2}$$

BPSK modulation data in accordance with aspects of the present disclosure. The communications manager 1305 may be an example of aspects of a communications manager 1115, a communications manager 1215, or a communications manager 1410 described herein. The communications manager 1305 may include a sequence length component 1310, a modulation component 1315, a sequence selection component 1320, a signal component 1325, and a demodulation component 1330. Each of these modules may communicate, directly or indirectly, with one another (e.g., via one or more buses).

The sequence length component 1310 may identify a sequence length corresponding to a number of resource blocks. In some examples, the sequence length component 1310 may identify a sequence length corresponding to the number of resource blocks based on the control message, where the sequence is from a set of sequences including at least one of a set of time domain phase shift keying computer-generated sequences or a set of frequency domain phase shift keying computer-generated sequences. The sequence length component 1310 may identify that the sequence length satisfies a threshold length, and select the set of time domain phase shift keying computer-generated sequences or the set of frequency domain phase shift keying computer-generated sequences based at least in part on the sequence length satisfying the threshold. The sequence length component 1310 may identify that the sequence length satisfies a threshold length, and select the set of frequency domain phase shift keying computer-generated sequences based at least in part on the sequence length satisfying the threshold. The sequence length component 1310 may select a time-domain sequence when the sequence length is a first value or selecting a frequency-domain sequence when the sequence length is a second value.

The modulation component 1315 may select a modulation scheme based on the sequence length. In some examples, the modulation component 1315 may modulate the data transmission using π/2 BPSK modulation to generate π/2 BPSK modulated data transmission. In some examples, the modulation component 1315 may transmit the π/2 BPSK modulated data transmission within the number of resource blocks, where a peak to average power ratio associated with the π/2 BPSK modulated data transmission is within a threshold of a peak to average power ratio associated with the reference signal. In some examples, the modulation component 1315 may modulate the sequence using the modulation scheme, where generating the reference signal for the data transmission is further based on the modulating. The modulation component 1315 may identify a set of modulation schemes, where each modulation scheme is for a different sequence length, where the different sequence lengths includes at least one of a sequence of length 6, a sequence of length 12, a sequence of length 18, or a sequence of length 24, and identify the modulation scheme associated with the sequence length in the set of modulation schemes, where selecting the modulation scheme is further based at least in part on identifying the modulation scheme associated with the sequence length in the set of modulation schemes. The modulation component 1315 may select a first modulation scheme when the sequence length is a first value or selecting a second modulation scheme when sequence length is a second value. In some examples, the first modulation scheme includes an 8PSK sequence when the sequence length is a length of 6 and the second modulation scheme includes a $$\frac{\pi}{2}$$

sequence when the sequence length is greater than the length of 6.

The sequence selection component 1320 may select, from a set of sequences associated with the modulation scheme, a sequence having the sequence length, where the set of sequences includes at least one of a set of time domain phase shift keying computer-generated sequences or a set of frequency domain phase shift keying computer-generated sequences. In some examples, the sequence selection component 1320 may identify a set of sequence tables that each include a set of sequences for a modulation scheme and for a different sequence length. In some examples, the sequence selection component 1320 may identify, from the set of sequence tables, a sequence table including the set of sequences associated with the sequence length and the modulation scheme, where selecting the sequence is further based on identifying the sequence table. In some examples, the sequence selection component 1320 may select a sequence that includes a set of time domain phase shift keying computer-generated sequences or a set of frequency domain phase shift keying computer-generated sequences.

The sequence selection component 1320 may generate a set of sequence tables that each include a set of sequences for a modulation scheme and for a different sequence length. In some examples, the sequence selection component 1320 may generate each sequence of the set of sequences based on the equation $$x(k) = e^{j\phi(k)\frac{\pi}{8}},$$

where k may be an integer value ranging from 0 to 5. In some examples, a sequence length of each sequence of the set of sequences may be a length of 6, and each number in each sequence may have an integer value selected from a set of integer values including −7, −5, −3, −1, 1, 3, 5, and 7. In some aspects, one or more sequence tables of the set of sequence tables may include sequences [−7 −3 −7 −3 7 −5], [−7 −3 1 −5 −1 −5], and [−7 −3 3 −3 −7 −5]. The sequence selection component 1320 may identify a set of sequence tables that each include a set of sequences for a modulation scheme and for a different sequence length. In some examples, the sequence selection component 1320 may identify, from the set of sequence tables, a sequence table including the set of sequences associated with the sequence length and the modulation scheme, where demodulating the reference signal is further based on identifying the sequence table. In some examples, identifying a sequence that includes a set of time domain phase shift keying computer-generated sequences or a set of frequency domain phase shift keying computer-generated sequences.

The signal component 1325 may generate a reference signal for a data transmission based on the sequence. In some examples, the signal component 1325 may transmit the reference signal within the number of resource blocks. In some examples, the signal component 1325 may receive a control message including an indication of a number of resource blocks associated with a reference signal. In some examples, the signal component 1325 may receive the reference signal for a data transmission within the number of resource blocks, where the reference signal is generated based on a sequence having the sequence length.

The demodulation component 1330 may demodulate the reference signal based on a modulation scheme associated with the sequence length. In some examples, the demodulation component 1330 may demodulate the data transmission using a π/2 BPSK modulation scheme to generate a π/2 BPSK demodulated data transmission, where a peak to average power ratio associated with the π/2 BPSK demodulated data transmission is within a threshold of a peak to average power ratio associated with the reference signal.

FIG. 14 shows a diagram of a system 1400 including a device 1405 that supports computer-generated sequence design for $$\frac{\pi}{2}$$

BPSK modulation data in accordance with aspects of the present disclosure. The device 1405 may be an example of or include the components of device 1105, device 1205, or a device as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may identify a sequence length corresponding to a number of resource blocks, select a modulation scheme based on the sequence length, select, from a set of sequences associated with the modulation scheme, a sequence having the sequence length, where the set of sequences includes at least one of a set of time domain phase shift keying computer-generated sequences or a set of frequency domain phase shift keying computer-generated sequences, generate a reference signal for a data transmission based on the sequence, and transmit the reference signal within the number of resource blocks. The communications manager 1410 may also receive a control message including an indication of a number of resource blocks associated with a reference signal, receive the reference signal for a data transmission within the number of resource blocks, where the reference signal is generated based on a sequence having the sequence length, identify a sequence length corresponding to the number of resource blocks based on the control message, where the sequence is from a set of sequences including at least one of a set of time domain phase shift keying computer-generated sequences or a set of frequency domain phase shift keying computer-generated sequences, and demodulate the reference signal based on a modulation scheme associated with the sequence length.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases the device 1405 may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting computer-generated sequence design for $$\frac{\pi}{2}$$

BPSK modulation data).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
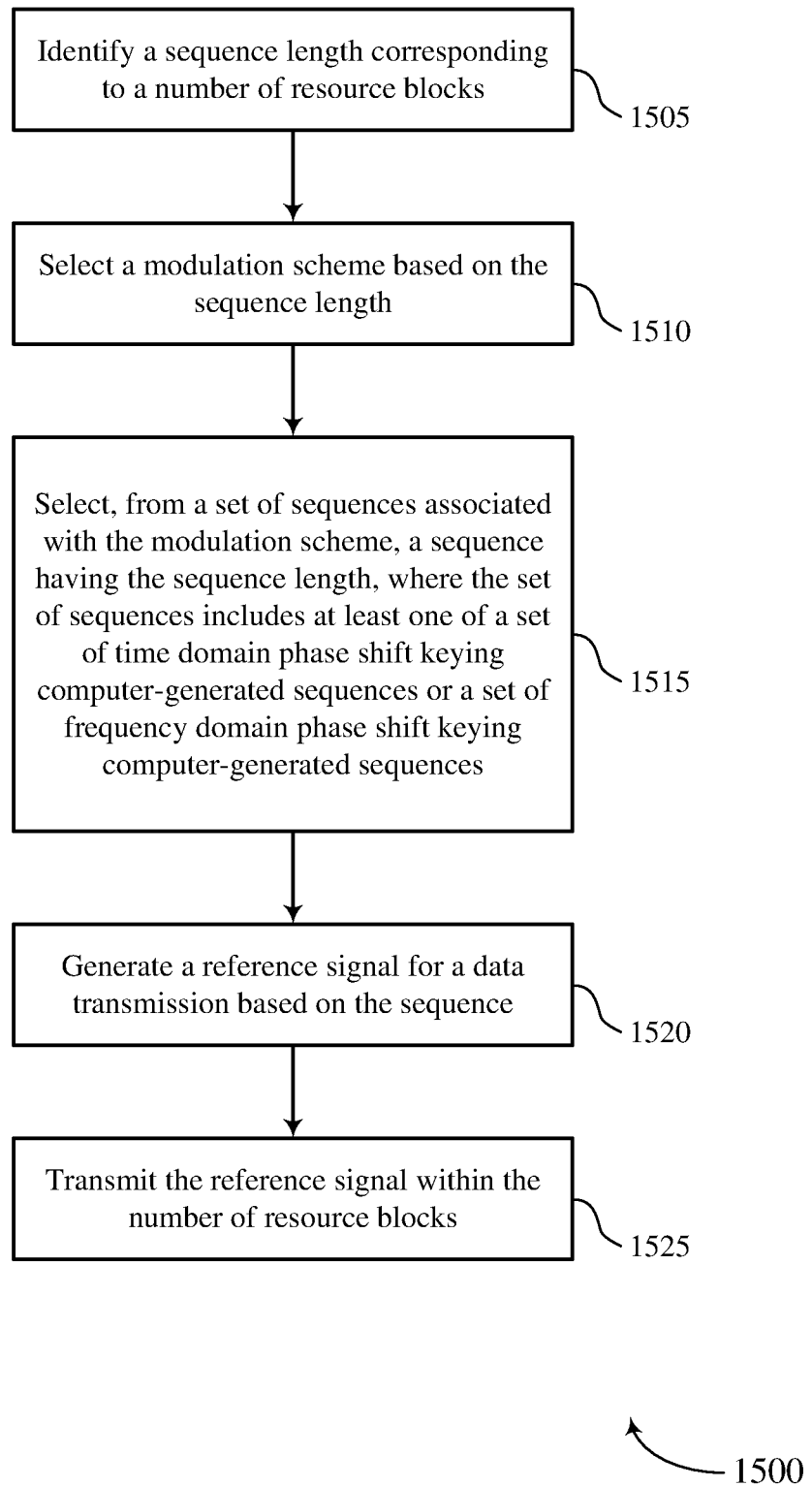

FIG. 15 shows a flowchart illustrating a method 1500 that supports computer-generated sequence design for $$\frac{\pi}{2}$$

BPSK modulation data in accordance with aspects of the present disclosure. The operations of method 1500 may be implemented by a device or its components as described herein. For example, the operations of method 1500 may be performed by a communications manager as described with reference to FIGS. 11 through 14. In some examples, a device may execute a set of instructions to control the functional elements of the device to perform the functions described below. Additionally or alternatively, a device may perform aspects of the functions described below using special-purpose hardware.

At 1505, the device may identify a sequence length corresponding to a number of resource blocks. The operations of 1505 may be performed according to the methods described herein. In some examples, aspects of the operations of 1505 may be performed by a sequence length component as described with reference to FIGS. 11 through 14.

At 1510, the device may select a modulation scheme based on the sequence length. The operations of 1510 may be performed according to the methods described herein. In some examples, aspects of the operations of 1510 may be performed by a modulation component as described with reference to FIGS. 11 through 14.

At 1515, the device may select, from a set of sequences associated with the modulation scheme, a sequence having the sequence length, where the set of sequences includes at least one of a set of time domain phase shift keying computer-generated sequences or a set of frequency domain phase shift keying computer-generated sequences. The operations of 1515 may be performed according to the methods described herein. In some examples, aspects of the operations of 1515 may be performed by a sequence selection component as described with reference to FIGS. 11 through 14.

At 1520, the device may generate a reference signal for a data transmission based on the sequence. The operations of 1520 may be performed according to the methods described herein. In some examples, aspects of the operations of 1520 may be performed by a signal component as described with reference to FIGS. 11 through 14.

At 1525, the device may transmit the reference signal within the number of resource blocks. The operations of 1525 may be performed according to the methods described herein. In some examples, aspects of the operations of 1525 may be performed by a signal component as described with reference to FIGS. 11 through 14.

Figure 16:
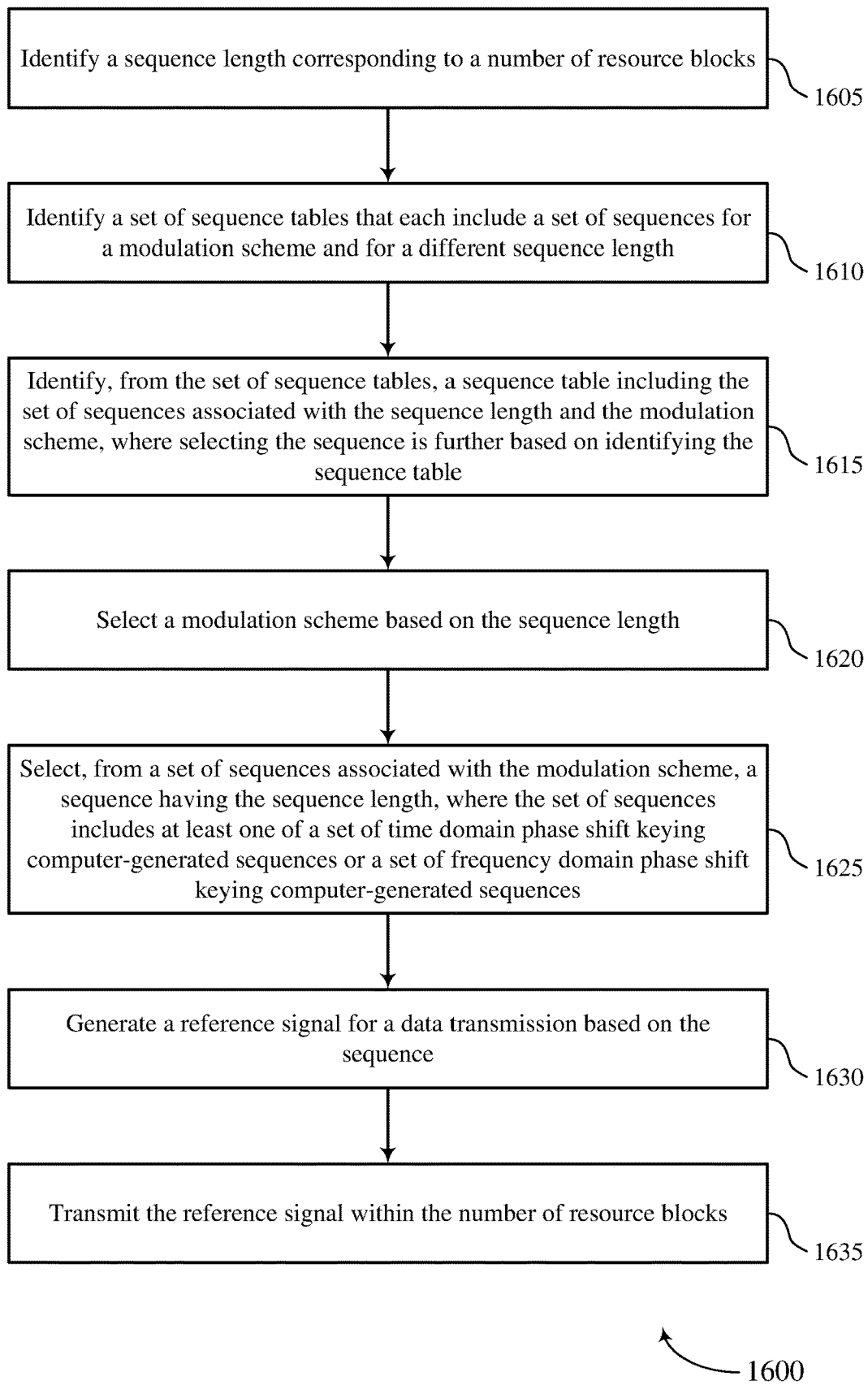

FIG. 16 shows a flowchart illustrating a method 1600 that supports computer-generated sequence design for $$\frac{\pi}{2}$$

BPSK modulation data in accordance with aspects of the present disclosure. The operations of method 1600 may be implemented by a device or its components as described herein. For example, the operations of method 1600 may be performed by a communications manager as described with reference to FIGS. 11 through 14. In some examples, a device may execute a set of instructions to control the functional elements of the device to perform the functions described below. Additionally or alternatively, a device may perform aspects of the functions described below using special-purpose hardware.

At 1605, the device may identify a sequence length corresponding to a number of resource blocks. The operations of 1605 may be performed according to the methods described herein. In some examples, aspects of the operations of 1605 may be performed by a sequence length component as described with reference to FIGS. 11 through 14.

At 1610, the device may identify a set of sequence tables that each include a set of sequences for a modulation scheme and for a different sequence length. The operations of 1610 may be performed according to the methods described herein. In some examples, aspects of the operations of 1610 may be performed by a sequence selection component as described with reference to FIGS. 11 through 14.

At 1615, the device may identify, from the set of sequence tables, a sequence table including the set of sequences associated with the sequence length and the modulation scheme, where selecting the sequence is further based on identifying the sequence table. The operations of 1615 may be performed according to the methods described herein. In some examples, aspects of the operations of 1615 may be performed by a sequence selection component as described with reference to FIGS. 11 through 14.

At 1620, the device may select a modulation scheme based on the sequence length. The operations of 1620 may be performed according to the methods described herein. In some examples, aspects of the operations of 1620 may be performed by a modulation component as described with reference to FIGS. 11 through 14.

At 1625, the device may select, from a set of sequences associated with the modulation scheme, a sequence having the sequence length, where the set of sequences includes at least one of a set of time domain phase shift keying computer-generated sequences or a set of frequency domain phase shift keying computer-generated sequences. The operations of 1625 may be performed according to the methods described herein. In some examples, aspects of the operations of 1625 may be performed by a sequence selection component as described with reference to FIGS. 11 through 14.

At 1630, the device may generate a reference signal for a data transmission based on the sequence. The operations of 1630 may be performed according to the methods described herein. In some examples, aspects of the operations of 1630 may be performed by a signal component as described with reference to FIGS. 11 through 14.

At 1635, the device may transmit the reference signal within the number of resource blocks. The operations of 1635 may be performed according to the methods described herein. In some examples, aspects of the operations of 1635 may be performed by a signal component as described with reference to FIGS. 11 through 14.

Figure 17:
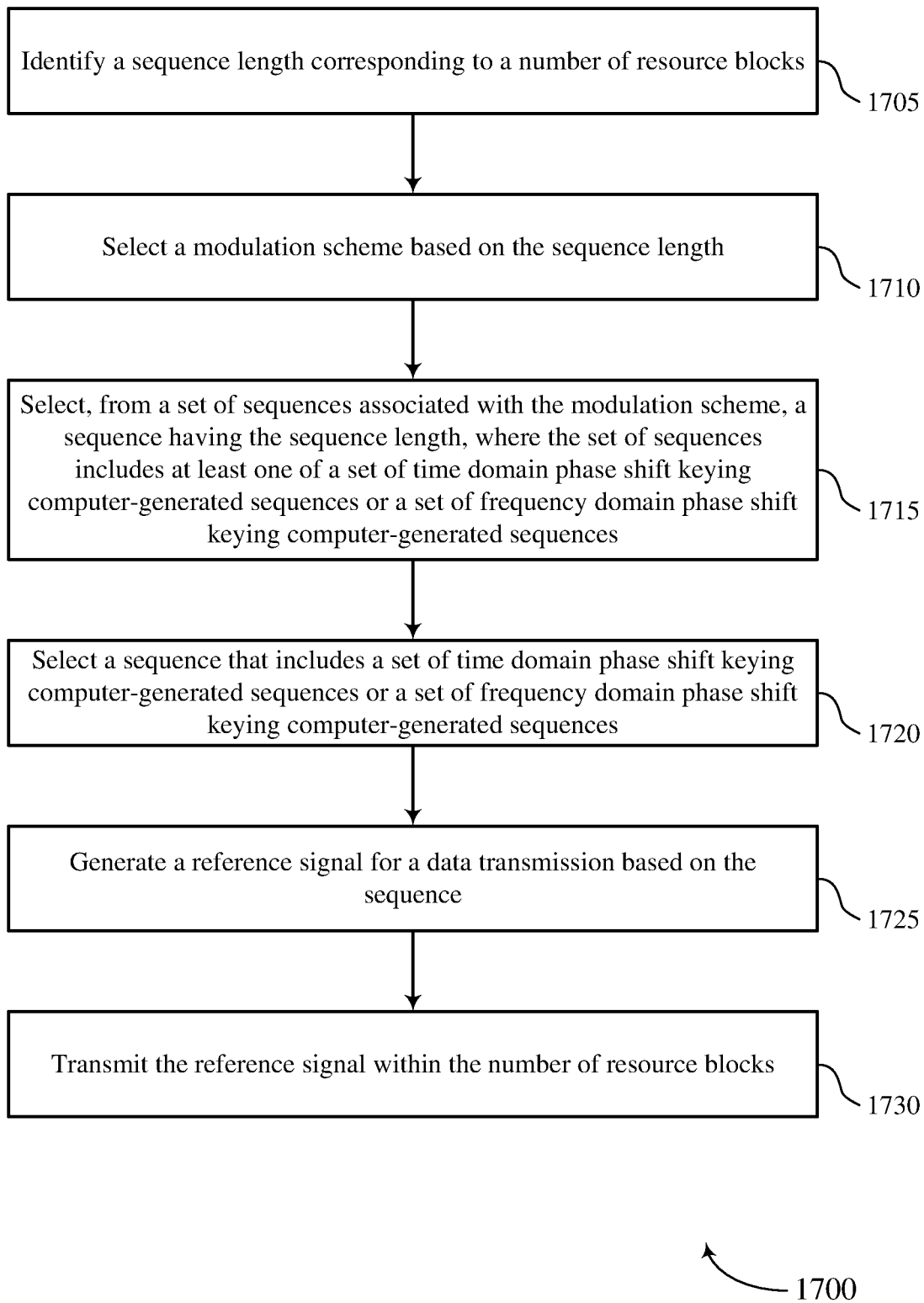

FIG. 17 shows a flowchart illustrating a method 1700 that supports computer-generated sequence design for $$\frac{\pi}{2}$$

BPSK modulation data in accordance with aspects of the present disclosure. The operations of method 1700 may be implemented by a device or its components as described herein. For example, the operations of method 1700 may be performed by a communications manager as described with reference to FIGS. 11 through 14. In some examples, a device may execute a set of instructions to control the functional elements of the device to perform the functions described below. Additionally or alternatively, a device may perform aspects of the functions described below using special-purpose hardware.

At 1705, the device may identify a sequence length corresponding to a number of resource blocks. The operations of 1705 may be performed according to the methods described herein. In some examples, aspects of the operations of 1705 may be performed by a sequence length component as described with reference to FIGS. 11 through 14.

At 1710, the device may select a modulation scheme based on the sequence length. The operations of 1710 may be performed according to the methods described herein. In some examples, aspects of the operations of 1710 may be performed by a modulation component as described with reference to FIGS. 11 through 14.

At 1715, the device may select, from a set of sequences associated with the modulation scheme, a sequence having the sequence length, where the set of sequences includes at least one of a set of time domain phase shift keying computer-generated sequences or a set of frequency domain phase shift keying computer-generated sequences. The operations of 1715 may be performed according to the methods described herein. In some examples, aspects of the operations of 1715 may be performed by a sequence selection component as described with reference to FIGS. 11 through 14.

At 1720, the device may select a sequence that includes a set of time domain phase shift keying computer-generated sequences or a set of frequency domain phase shift keying computer-generated sequences. For example, the device may select a sequence that includes a set of time-domain PSK symbols. The operations of 1720 may be performed according to the methods described herein. In some examples, aspects of the operations of 1720 may be performed by a sequence selection component as described with reference to FIGS. 11 through 14.

At 1725, the device may generate a reference signal for a data transmission based on the sequence. The operations of 1725 may be performed according to the methods described herein. In some examples, aspects of the operations of 1725 may be performed by a signal component as described with reference to FIGS. 11 through 14.

At 1730, the device may transmit the reference signal within the number of resource blocks. The operations of 1730 may be performed according to the methods described herein. In some examples, aspects of the operations of 1730 may be performed by a signal component as described with reference to FIGS. 11 through 14.

Figure 18:
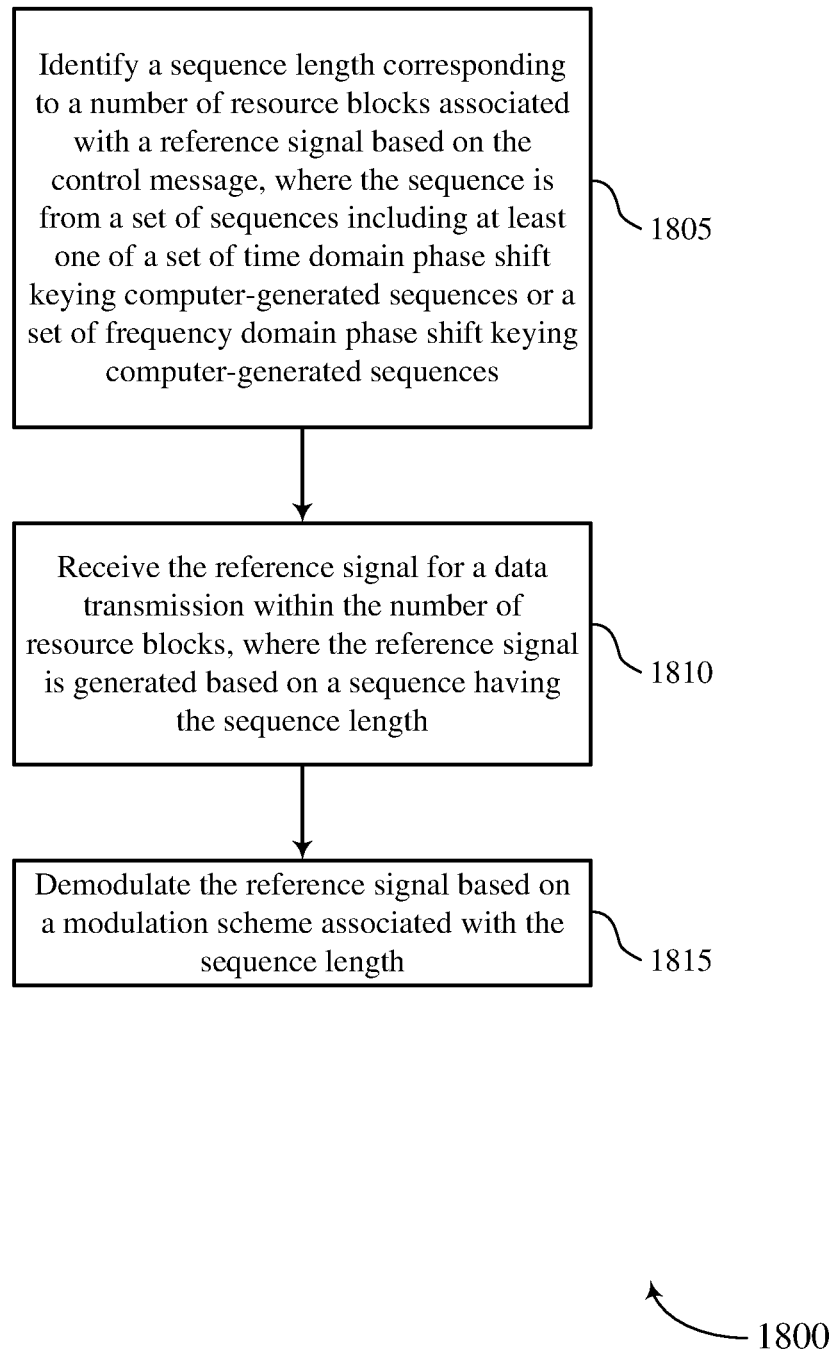

FIG. 18 shows a flowchart illustrating a method 1800 that supports computer-generated sequence design for $$\frac{\pi}{2}$$

BPSK modulation data in accordance with aspects of the present disclosure. The operations of method 1800 may be implemented by a device or its components as described herein. For example, the operations of method 1800 may be performed by a communications manager as described with reference to FIGS. 11 through 14. In some examples, a device may execute a set of instructions to control the functional elements of the device to perform the functions described below. Additionally or alternatively, a device may perform aspects of the functions described below using special-purpose hardware.

At 1805, the device may identify a sequence length corresponding to a number of resource blocks associated with a reference signal based on a control message, where the sequence is from a set of sequences including at least one of a set of time domain phase shift keying computer-generated sequences or a set of frequency domain phase shift keying computer-generated sequences. The operations of 1805 may be performed according to the methods described herein. In some examples, aspects of the operations of 1805 may be performed by a sequence length component as described with reference to FIGS. 11 through 14.

At 1810, the device may receive the reference signal for a data transmission within the number of resource blocks, where the reference signal is generated based on a sequence having the sequence length. The operations of 1810 may be performed according to the methods described herein. In some examples, aspects of the operations of 1810 may be performed by a signal component as described with reference to FIGS. 11 through 14.

At 1815, the device may demodulate the reference signal based on a modulation scheme associated with the sequence length. The operations of 1815 may be performed according to the methods described herein. In some examples, aspects of the operations of 1815 may be performed by a demodulation component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying a sequence length corresponding to a number of resource blocks associated with a reference signal, wherein the sequence is from a set of sequences comprising at least one of a set of time domain phase shift keying computer-generated sequences or a set of frequency domain phase shift keying computer-generated sequences;
   receiving the reference signal for a transmission within the number of resource blocks, wherein the reference signal is generated based at least in part on a sequence having the sequence length; and
   demodulating the reference signal based at least in part on a modulation scheme associated with the sequence length, wherein the modulation scheme comprises an 8 phase shift keying (8PSK) modulation scheme and the set of time domain phase shift keying computer-generated sequence comprises time domain 8PSK sequences of length 6.

2. The method of claim 1, wherein the transmission comprises a π/2 binary phase shift keying modulated data transmission.

3. The method of claim 1, wherein the transmission comprises at least one of a physical uplink shared channel (PUSCH) transmission, a physical uplink control channel (PUCCH) transmission, a physical downlink shared channel (PDSCH) transmission, a physical downlink control channel (PDCCH) transmission, a physical sidelink shared channel (PSSCH) transmission, or a physical sidelink control channel (PSCCH) transmission.

4. The method of claim 1, wherein the set of time domain phase shift keying computer-generated sequence comprises at least one of time domain 8PSK sequences of length 12, time domain 8PSK sequences of length 18, or time domain 8PSK sequences of length 24.

5. The method of claim 1, wherein the set of frequency domain phase shift keying computer-generated sequence comprises at least one of frequency domain 8PSK sequences of length 6, frequency domain 8PSK sequences of length 12, frequency domain 8PSK sequences of length 18, or frequency domain 8PSK sequences of length 24.

6. The method of claim 1, further comprising:
   demodulating the transmission using a π/2 binary phase shift keying modulation scheme to generate a π/2 binary phase shift keying demodulated data transmission, wherein a peak to average power ratio associated with the π/2 binary phase shift keying demodulated data transmission is within a threshold of a peak to average power ratio associated with the reference signal.

7. The method of claim 1, further comprising:
identifying a set of sequence tables that each comprise a set of sequences for a modulation scheme and for a different sequence length; and
identifying, from the set of sequence tables, a sequence table comprising the set of sequences associated with the sequence length and the modulation scheme, wherein demodulating the reference signal is further based at least in part on identifying the sequence table.

8. The method of claim 7, wherein each sequence table comprises at least one of a set of time domain phase shift keying computer-generated sequences or a set of frequency domain phase shift keying computer-generated sequences corresponding to a certain sequence length.

9. The method of claim 7, wherein each sequence in the set of sequences is unique.

10. The method of claim 7, wherein each sequence in the set of sequences satisfies a cyclic auto-correlation property.

11. The method of claim 7, wherein each sequence in the set of sequences satisfies a cross-correlation property within the set of sequences.

12. The method of claim 7, wherein the set of sequences comprises a level of correlation with a set of quadrature phase shift keying (QPSK) sequences.

13. The method of claim 12, wherein a cross-correlation between the set of sequences and the QPSK sequences is lower than a threshold, wherein the set of sequences is associated with a first radio access technology and the QPSK sequences are associated with a second radio access technology different from the first radio access technology.

14. The method of claim 1, wherein identifying the sequence comprises:
identifying a sequence that comprises a set of time domain phase shift keying computer-generated sequences or a set of frequency domain phase shift keying computer-generated sequences.

15. The method of claim 1, wherein the sequence length comprises a sequence of length 6, a sequence of length 12, a sequence of length 18, or a sequence of length 24.

16. The method of claim 1, wherein the modulation scheme comprises at least one of an 8 phase shift keying (8PSK) modulation scheme, a 12 phase shift keying (12PSK) modulation scheme, or a $\pi/4$ quadrature phase shift keying ($\pi/4$ QPSK) modulation scheme, or a QPSK modulation scheme.

17. An apparatus for wireless communications, comprising:
a processor,
memory in electronic communication with the processor; and
instructions stored in the memory and executable by the processor to cause the apparatus to:
identify a sequence length corresponding to a number of resource blocks associated with a reference signal, wherein the sequence is from a set of sequences comprising at least one of a set of time domain phase shift keying computer-generated sequences or a set of frequency domain phase shift keying computer-generated sequences;
receive the reference signal for a transmission within the number of resource blocks, wherein the reference signal is generated based at least in part on a sequence having the sequence length; and
demodulate the reference signal based at least in part on a modulation scheme associated with the sequence length, wherein the modulation scheme comprises an 8 phase shift keying (8PSK) modulation scheme and the set of time domain phase shift keying computer-generated sequence comprises time domain 8PSK sequences of length 6.

18. The apparatus of claim 17, wherein the instructions to demodulate the reference signal are further executable by the processor to cause the apparatus to:
demodulate the reference signal based at least in part on a first modulation scheme when the sequence length is a first value or demodulate the reference signal based at least in part on a second modulation scheme when sequence length is a second value.

19. The apparatus of claim 18, wherein the first modulation scheme comprises an 8PSK sequence when the sequence length is a length of 6 and the second modulation scheme comprises a $\pi/2$ sequence when the sequence length is greater than the length of 6.

* * * * *